United States Patent [19]
Kawamura

[11] Patent Number: 6,009,229
[45] Date of Patent: Dec. 28, 1999

[54] DATA CODING/DECODING METHOD AND APPARATUS AND CODED DATA RECORDING MEDIUM

[75] Inventor: Makoto Kawamura, Kanagawa, Japan

[73] Assignee: Sony Corporation, Tokyo, Japan

[21] Appl. No.: 08/688,819

[22] Filed: Jul. 26, 1996

[30] Foreign Application Priority Data

Jul. 28, 1995 [JP] Japan .................................. 7-211420

[51] Int. Cl.[6] .................................................. H04N 5/91
[52] U.S. Cl. .............................. 386/68; 386/82; 386/111
[58] Field of Search ................................ 386/33, 45, 82, 386/109, 111–112, 125–126, 68, 81; 360/8; 348/423; H04N 5/91

[56] References Cited

U.S. PATENT DOCUMENTS

| | | | |
|---|---|---|---|
| 5,168,356 | 12/1992 | Acampora et al. | 358/133 |
| 5,455,684 | 10/1995 | Fujinami et al. | 358/335 |
| 5,535,008 | 7/1996 | Yamagashi et al. | 358/342 |
| 5,557,331 | 9/1996 | Honjo | 348/410 |
| 5,602,956 | 2/1997 | Suzuki et al. | 386/68 |
| 5,619,338 | 4/1997 | Nakai et al. | 386/70 |
| 5,642,338 | 6/1997 | Fukushima et al. | 369/59 |
| 5,655,052 | 8/1997 | Nakai et al. | 386/106 |
| 5,715,354 | 2/1998 | Iwamura et al. | 386/68 |
| 5,715,356 | 2/1998 | Hirayama et al. | 386/96 |
| 5,841,938 | 11/1998 | Nitta et al. | 386/68 |

*Primary Examiner*—Thai Tran
*Assistant Examiner*—Vincent F. Boccio
*Attorney, Agent, or Firm*—Frommer Lawrence & Haug, LLP.; William S. Frommer

[57] ABSTRACT

Apparatus and method of recording coded picture data on a recording medium which operates to receive the picture data (e.g., a video data), code the picture data using intra-picture coding and/or predictive coding to provide one I-picture and one succeeding P-picture, generate positional information representing the positions of the I-picture and the P-picture relative to the I-picture, and record the I-picture, the P-picture, and the positional information on the recording medium. The coded picture data is reproduced from the recording medium in a special reproduction mode by selectively reading the data using the positional information.

62 Claims, 23 Drawing Sheets

FIG. 4

PSM Syntax

| Syntax | No. of Bits | Mnemonic |
|---|---|---|
| PSM() | | |
| { | | |
|    packet_start_code_prefix | 24 | bslbf |
|    map_stream_id | 8 | uimsbf |
|    program_stream_map_length | 16 | uimsbf |
|    current_next_indicator | 1 | bslbf |
|    reserved | 2 | bslbf |
|    program_stream_map_version | 5 | uimsbf |
|    reserved | 7 | bslbf |
|    marker_bit | 1 | bslbf |
|    program_stream_info_length | 16 | uimsbf |
|    global_descriptors() | | |
|    elementary_stream_map_length | 16 | uimsbf |
|    for(all elementary streams) { | | |
|       stream_type | 8 | uimsbf |
|       elementary_stream_id | 8 | uimsbf |
|       elementary_stream_info_length | 16 | uimsbf |
|       if(stream_id == private_data_1 \|\| | | |
|          stream_id == private_data_2) { | | |
|          DVD_private_stream_descriptor() | | |
|       } | | |
|       elementary_stream_descriptors() | | |
|    } | | |
|    CRC_32 | 32 | rpchof |
| } | | |

FIG. 5

Elementary Stream Descriptors Syntax

| Syntax | No of Bits | Mnemonic |
|---|---|---|
| elementary_stream descriptor() { | | |
|   if((referenced elementary stream-type is video)) { | | |
|     dvd_video_descriptor() | | |
|     ip_ipp_descriptor() | | |
|   } | | |
|   if((referenced elementary stream-type is audio)) { | | |
|     dvd_audio_descriptor() | | |
|     ISO_639_language_descriptor() | | |
|   } | | |
|   if((referenced elementary stream-type is lpcm)) { | | |
|     dvd_lpcm_descriptor() | | |
|     ISO_639_language_descriptor() | | |
|   } | | |
|   if((referenced elementary stream-type is subtitle)) { | | |
|     dvd_subtitle_descriptor() | | |
|     ISO_639_language_descriptor() | | |
|   } | | |
|   if((this optional descriptor is included)) | | |
|     copyright_descriptor() | | |
|   if((this optional descriptor is included)) | | |
|     for(i=0;i<num_padding_descriptors;i++) | | |
|       padding_descriptor() | | |
|   if((non-DVD descriptors are included)) | | |
|     descriptors() | | |
| } | | |

FIG. 6

IP_IPP descriptor

| ip_ipp_descripor ( ) | No. of bits | Mnemonic |
|---|---|---|
| { | | |
| descriptor_tag | 8 | uimsbf |
| descriptor_length | 8 | uimsbf |
| bytes_to_first_P_pic | 32 | uimsbf |
| bytes_to_second_P_pic | 32 | uimsbf |
| } | | |

FIG. 7

Global Descriptors Syntax

| Syntax | No of Bits | Mnemonic |
|---|---|---|
| global_descriptors ( ) <br> { <br>    for ( p=0;P<max_number_of_paths;p++) <br>    path_descriptor ( ) <br>    program_descriptor ( ) <br>    if(<this optional descriptor is included>) <br>       stream_grouping descriptor ( ) <br>    if(<this optional descriptor is included>) <br>       copy_control_descriptor ( ) <br>    if(<this optional descriptor is included>) <br>       copyright_descriptor ( ) <br>    if(<this optional descriptor is included>) <br>       for (i=0; i<num_padding_descriptors; i++) <br>       padding_descriptor ( ) <br>    if(<non-DVD descriptors are included>) <br>       descriptors ( ) <br> } | | |

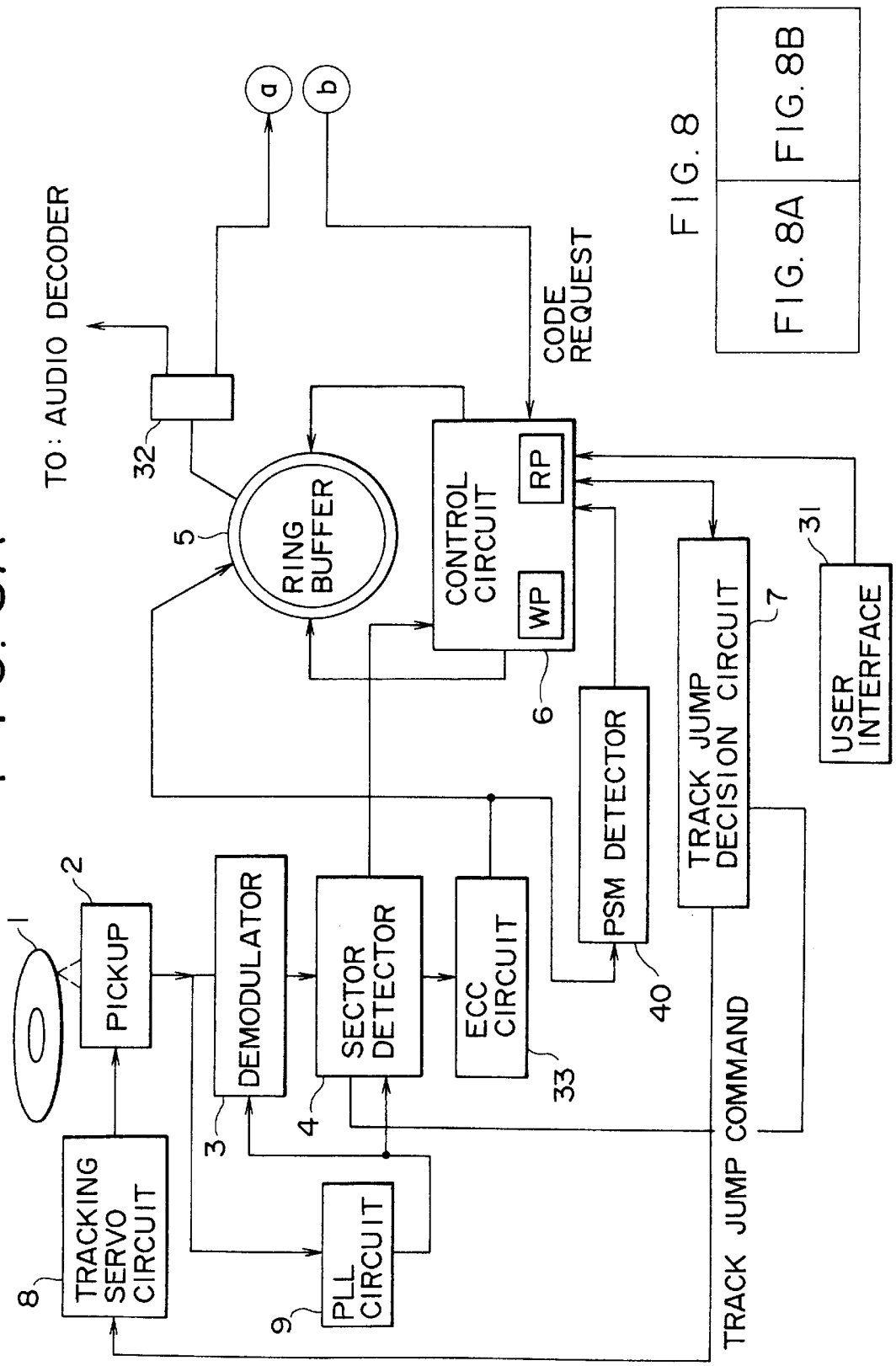

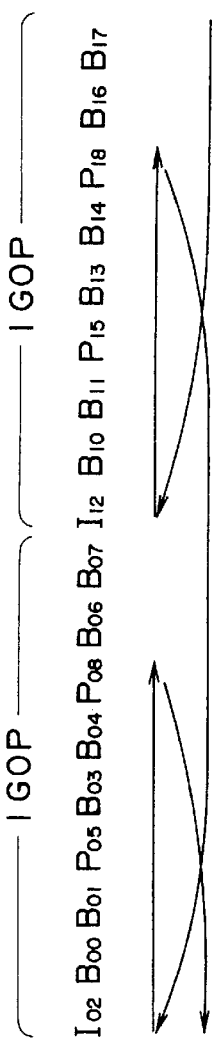
FIG. 9A  ON-DISK DATA ORDER 1 (VIDEO DATA ONLY)
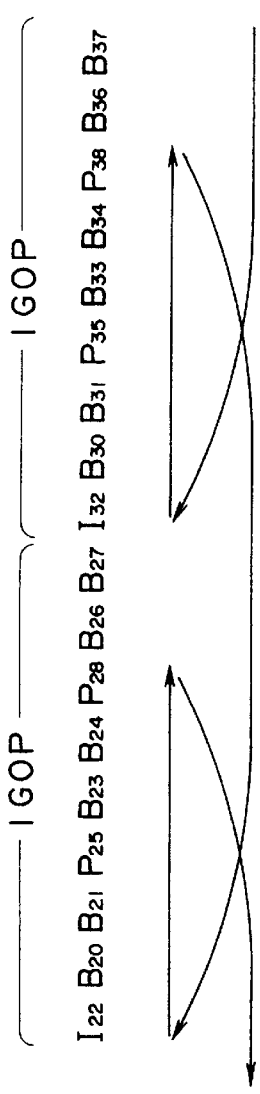
FIG. 9B  ON-DISK DATA ORDER 2 (VIDEO DATA ONLY)
FIG. 9C  PICTURE DISPLAY ORDER
$P_{38} \rightarrow P_{35} \rightarrow I_{32} \rightarrow P_{28} \rightarrow P_{25} \rightarrow P_{18} \rightarrow P_{15} \rightarrow I_{12} \rightarrow P_{08} \rightarrow P_{05} \rightarrow I_{02}$
FR REPRODUCTION

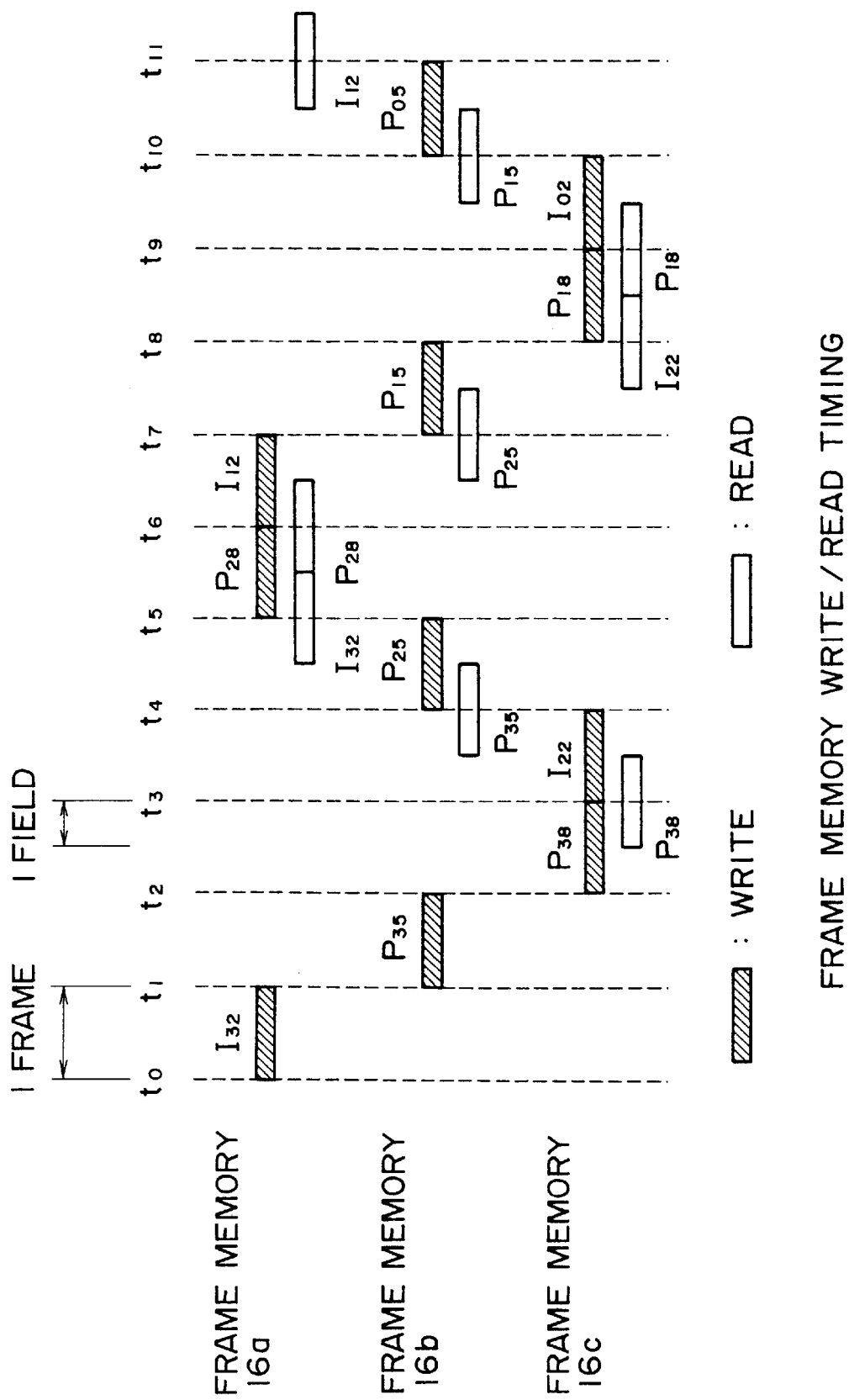

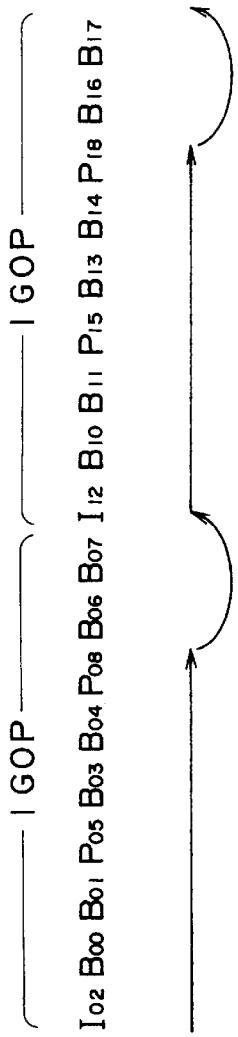
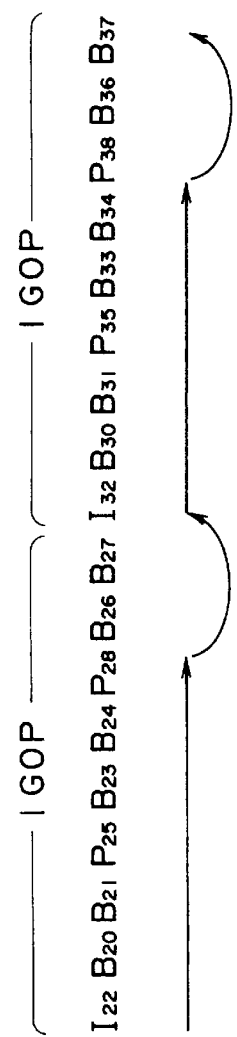
FIG. 11A ON-DISK DATA ORDER 1 (VIDEO DATA ONLY)
FIG. 11B ON-DISK DATA ORDER 2 (VIDEO DATA ONLY)
FIG. 11C PICTURE DISPLAY ORDER
$I_{02} \rightarrow P_{05} \rightarrow P_{08} \rightarrow I_{12} \rightarrow P_{15} \rightarrow P_{18} \rightarrow I_{22} \rightarrow P_{25} \rightarrow P_{28} \rightarrow I_{32} \rightarrow P_{35} \rightarrow P_{38}$
FF REPRODUCTION

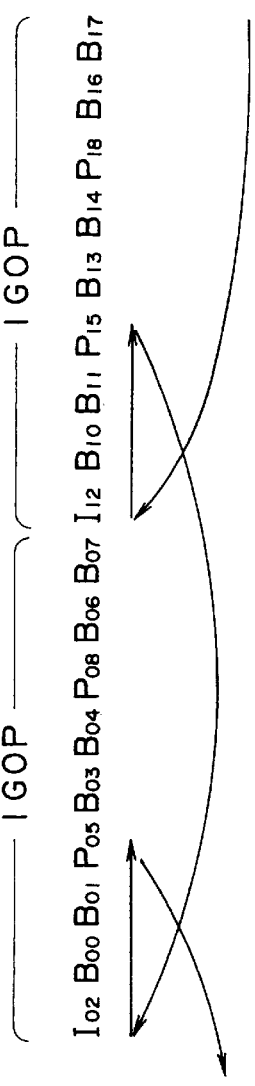
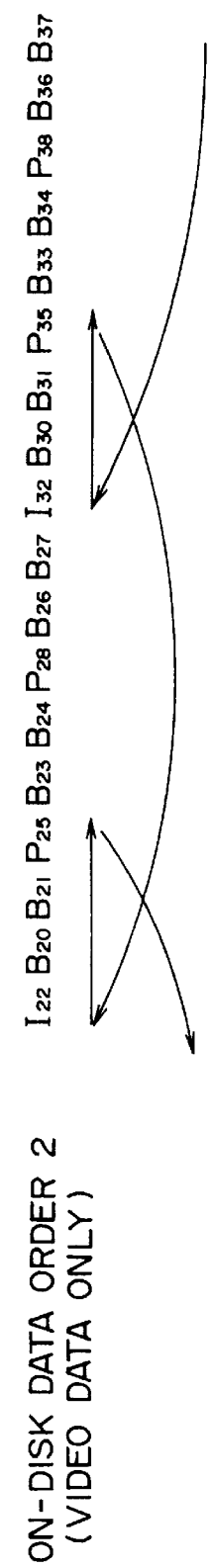
FIG. 12A ON-DISK DATA ORDER 1 (VIDEO DATA ONLY)
FIG. 12B ON-DISK DATA ORDER 2 (VIDEO DATA ONLY)
FIG. 12C PICTURE DISPLAY ORDER
$P_{35} \to I_{32} \to P_{25} \to I_{22} \to P_{15} \to I_{12} \to P_{05} \to I_{02}$
FR REPRODUCTION

INTER-FRAME PREDICTION STRUCTURE

RECORDING FRAME STRUCTURE

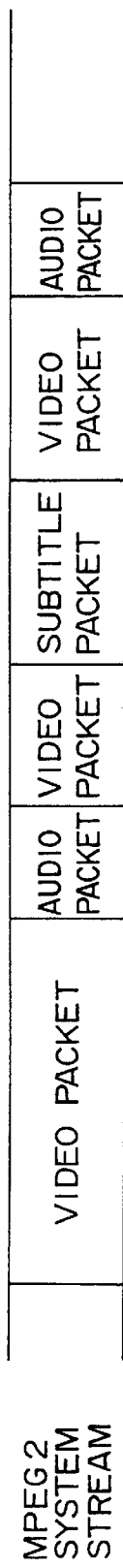
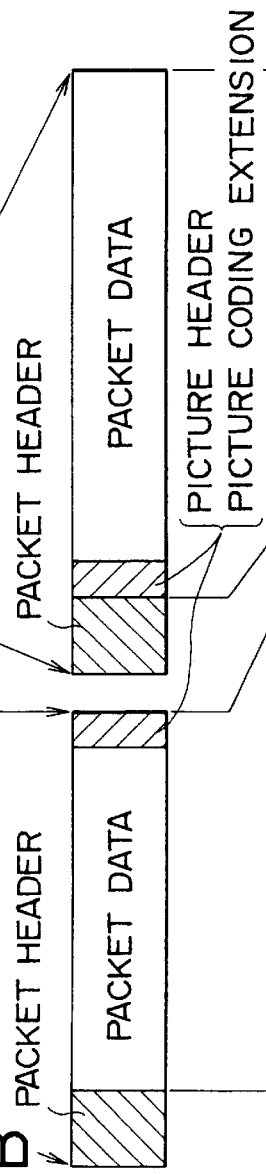
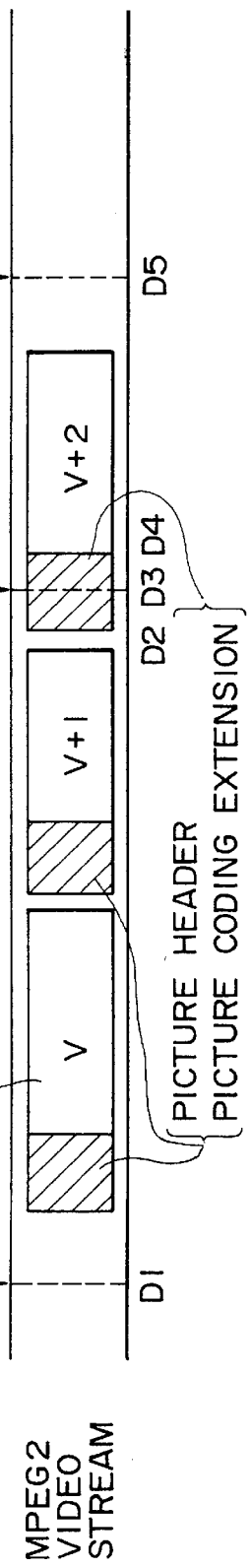

FIG. 16

Picture header

| Picture_header() { | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if (picture_coding_type ==2‖picture_coding_type == 3) { | | |
| full_pel_forward_vector | 1 | bslbf |
| forward_f_code | 3 | bslbf |
| } | | |
| if (picture_coding_type == 3) { | | |
| full_pel_backward_vector | 1 | bslbf |
| backward_f_code | 3 | bslbf |
| } | | |
| while (nextbits() =='1') { | | |
| extra_bit_picture /* with the value '1' */ | 1 | uimsbf |
| extra_information_picture | 8 | uimsbf |
| } | | |
| extra_bit_picture /* with the value '0' */ | 1 | uimsbf |
| next_start_code() | | |
| } | | |

FIG. 17

Picture coding extension

| picture_coding_extension ( ) { | No. of bits | Mnemonic |
|---|---|---|
| extension_start_code | 32 | bslbf |
| extension_start_code_identifier | 4 | uimsbf |
| f_code [0] [0]   /*forward horizontal*/ | 4 | uimsbf |
| f_code [0] [1]   /*forward vertical*/ | 4 | uimsbf |
| f_code [1] [0]   /*backward horizontal*/ | 4 | uimsbf |
| f_code [1] [1]   /*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if (composite_display_flag) { | | |
|   v_axis | 1 | uimsbf |
|   field_sequence | 3 | uimsbf |
|   sub_carrier | 1 | uimsbf |
|   burst_amplitude | 7 | uimsbf |
|   sub_carrier_phase | 8 | uimsbf |
| } | | |
| next_start_code ( ) | | |
| } | | |

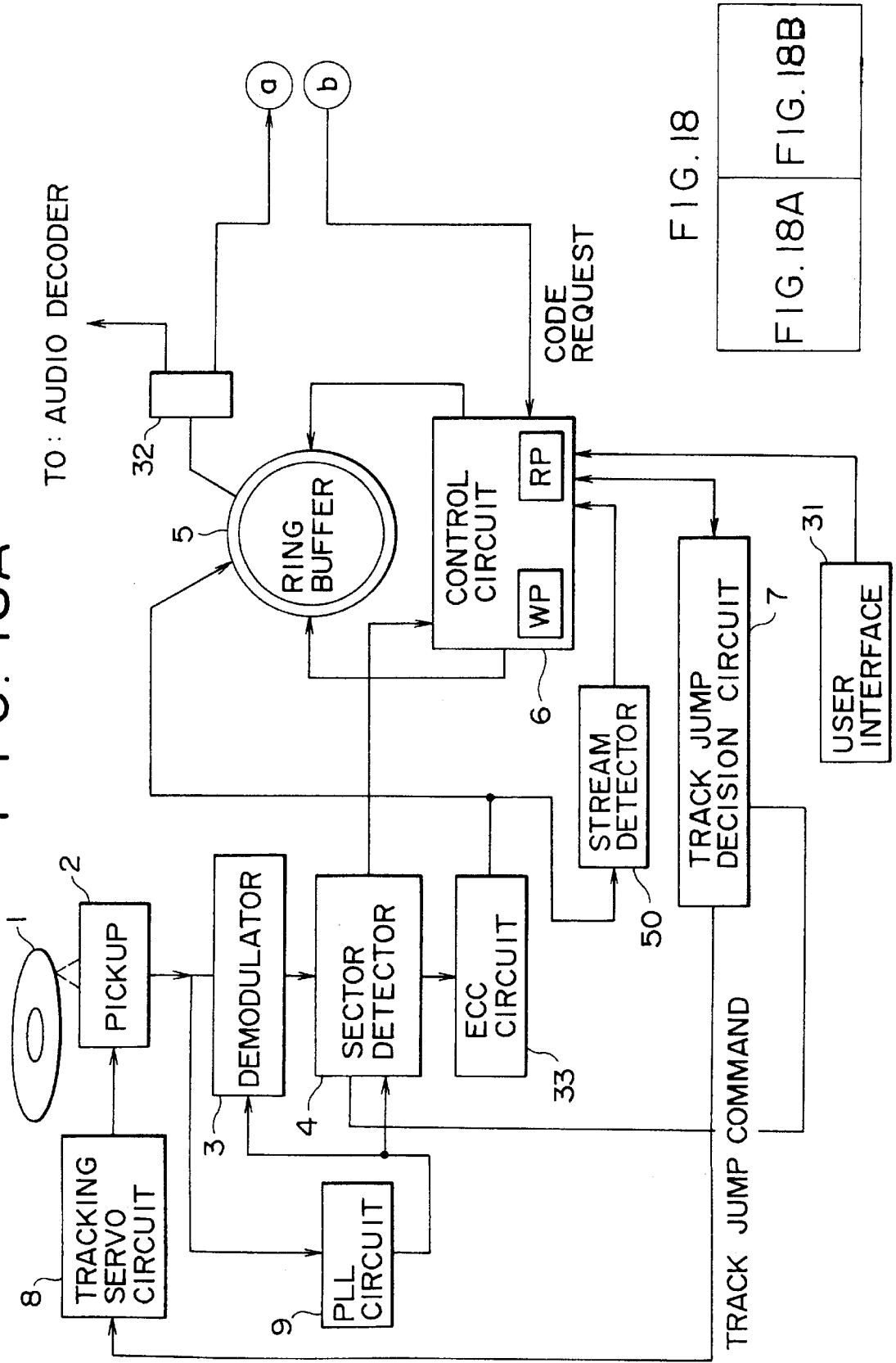

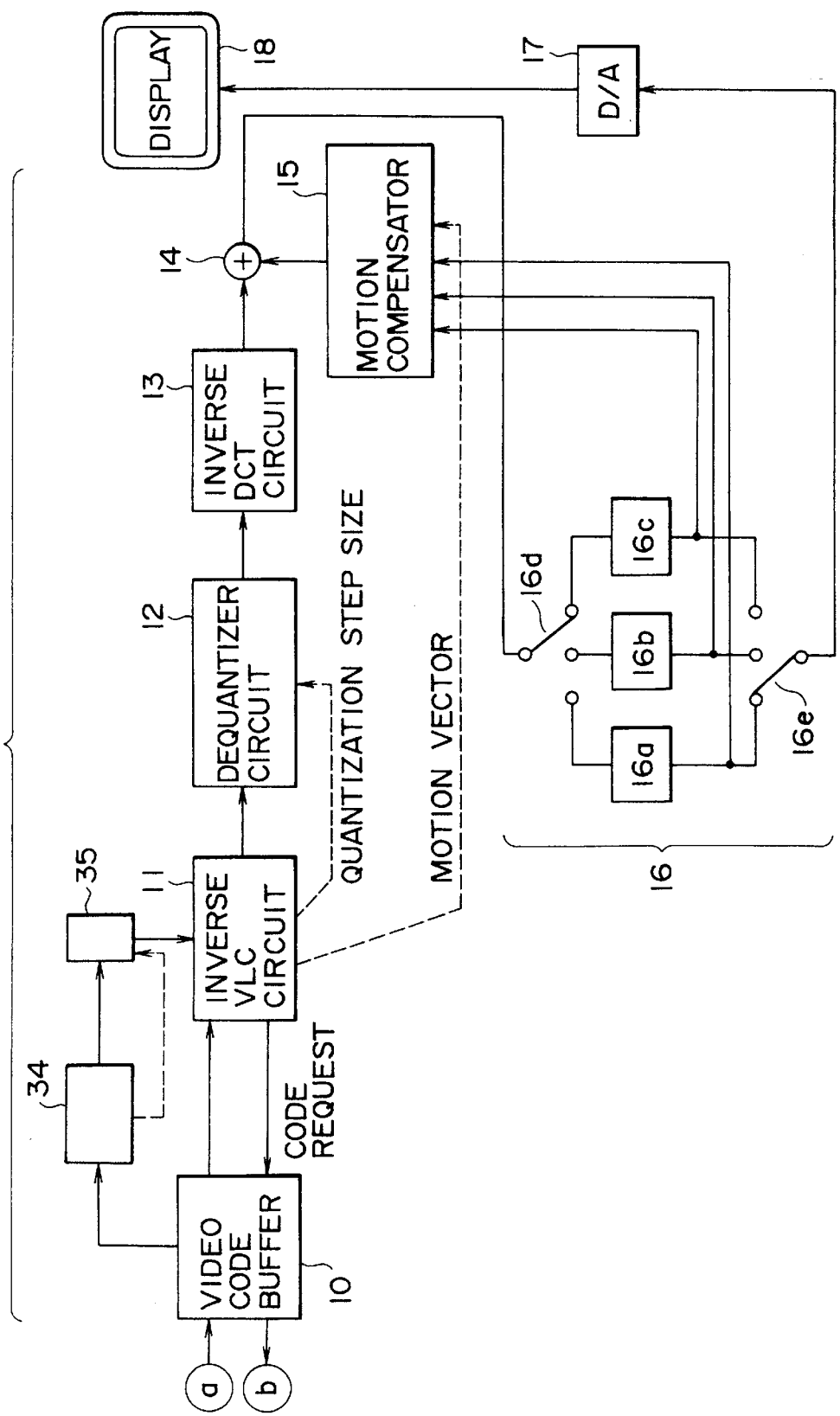

FIG. 19A
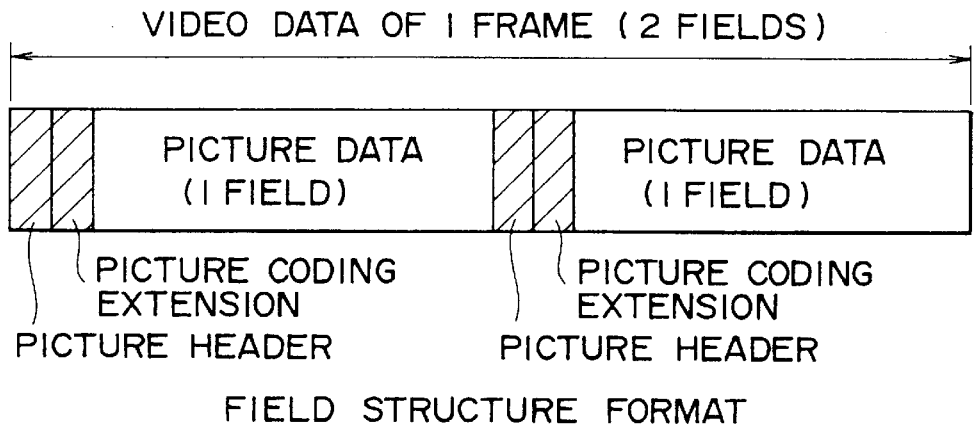
FIELD STRUCTURE FORMAT
FIG. 19B
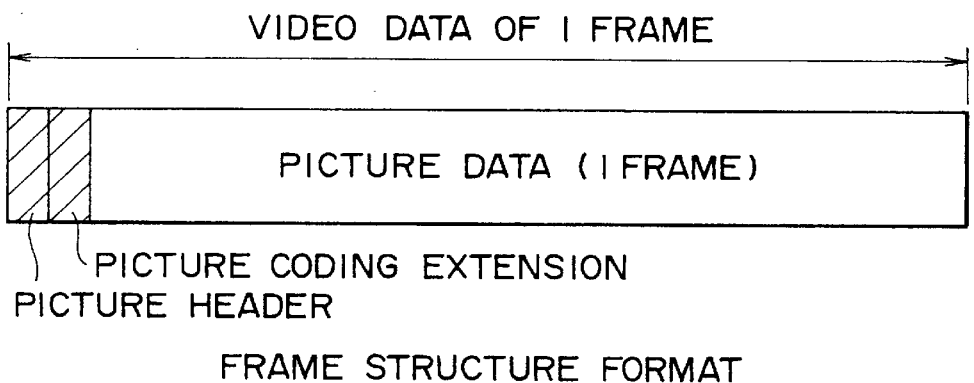
FRAME STRUCTURE FORMAT
FIG. 20
Meaning of picture_structure
| picture_structure | Meaning |
|---|---|
| 00 | reserved |
| 01 | Top Field |
| 10 | Bottom Field |
| 11 | Frame Picture |

DATA CODING/DECODING METHOD AND APPARATUS AND CODED DATA RECORDING MEDIUM

BACKGROUND OF THE INVENTION

The present invention relates to a data coding method and apparatus capable of coding video and audio data for special reproduction, to a data decoding method and apparatus for reading recorded video and audio data from an optical disk, a magnetic disk or the like and reproducing the read data in a special mode, and further relates to a recording medium where coded data is recorded in a manner so as to be reproducible in a special mode.

Digital picture signals or the like to be recorded on a disk in a digital video disk (hereinafter referred to as DVD) system, are compressed and coded using the MPEG (Motion Picture coding Experts Group) method.

FIG. 14A is a schematic representation of the structure of inter-frame prediction structure used in the MPEG system. In this example, one GOP (Group of Pictures) is composed of, e.g., fifteen frames, which include one frame of an I-picture (intraframe encoded picture), four frames of P-pictures (forward interframe prediction encoded pictures), and the remaining ten frames consisting of B-pictures (forwarded and backward, bidirectional prediction encoded pictures).

As used herein, the I-picture is an intra-picture coded picture in which either one frame or one field is data compressed using intra-frame or intra-field coding consistent with the MPEG system; the P-picture is an inter-picture forward predictive coded picture in which either a frame or a field is compression encoded using inter-frame or inter-field coding with reference to the temporally preceding frame or field (I-picture or P-picture) already coded; and the B-picture is a bidirectionally predictive coded picture in which either a frame or a field is compression encoded using inter-frame or inter-field coding with reference to the temporally preceding and succeeding frames or fields.

More specifically, as indicated by arrows in the diagram, an I-picture $I_0$ is coded by intra-frame processed by itself and without references to any other frame; a P-picture $P_0$ is coded by inter-frame prediction with reference to the I-picture $I_0$; and a P-picture $P_1$ is coded by inter-frame prediction with reference to the P-picture $P_0$. Further, B-pictures $B_0$, and $B_1$ are coded by inter-frame prediction with reference to both the I-picture $I_0$ and the P-picture $P_0$; and B-pictures $B_2$ and $B_3$ are coded by inter-frame prediction with reference to both the P-picture $P_0$ and the P-picture $P_1$. Similarly, subsequent pictures are coded by such prediction in the manner indicated by arrows.

In decoding the predictive-coded pictures mentioned, the I-picture is decoded alone since it is not coded with reference to any other frame. However, a preceding I-picture or a preceding P-picture is required to decode a given P-picture because a P-picture is predictive-coded with reference to the temporally preceding I-picture or P-picture. Similarly, preceding and succeeding I-pictures or P-pictures are required to decode a given B-picture because a B-picture is coded with reference to the temporally preceding and succeeding I-pictures or P-pictures.

For this reason, to provide proper decoding, positions of the pictures on a record medium are changed from FIG. 14A to the positions illustrated in FIG. 14B so that the pictures required for decoding are decoded in advance.

As illustrated in the diagram, such positional changes are made so that the I-picture $I_0$ precedes the B-pictures $B_{-1}$ and $B_{-2}$ since the I-picture $I_0$ is required to decode the B-pictures $B_{-1}$ and $B_{-2}$ and also the position of the P-picture $P_0$ is changed to precede the B-pictures $B_0$ and $B_1$ since the decoding of B-pictures $B_0$ and $B_1$ requires the I-picture $I_0$ and the P-picture $P_0$. Similarly, other pictures are positionally changed so that the P-picture $P_1$ precedes the B-pictures $B_2$ and $B_3$ since the P-pictures $P_0$ and $P_1$ are required to decode the B-pictures $B_2$ and $B_3$, and also the P-picture $P_2$ precedes the B-pictures $B_4$ and $B_5$ since the decoding of the B-pictures $B_4$ and $B_5$ requires the P-pictures $P_1$ and $P_2$. In the same manner, positional changes are made so that the P-picture $P_3$ precedes the B-pictures $B_6$ and $B_7$.

The video data composed of the I-picture, P-pictures and B-pictures arranged in the order of FIG. 14B, and other data including audio data and subtitle (captions) data, are packetized (multiplexed) and recorded on a recording medium such as a disk or are transmitted on a transmission channel. The code quantity of each frame in the picture data is not fixed among pictures and depends on the complexity or flatness of the individual picture. Typically, an I-picture is represented by more data than a P-picture which is represented by more data than a B-picture.

FIGS. 15A to 15C show one example of how the data is packetized. In these diagrams, FIG. 15A represents an MPEG2 system stream which is multiplexed after packetization; FIG. 15B represents the content of a video packet in the multiplexed stream; and FIG. 15C represents an MPEG2 video stream of a video layer.

In each of picture data V, V+1, V+2, . . . and so forth constituting the video layer of FIG. 15C, picture header information and picture coding extension information are affixed at the leading position. In the example shown, a video stream ranging from the position identified as D1 to the position identified as D3 of the video layer forms one video packet with a packet header affixed at its leading position, and a video stream ranging from the position D3 to the position identified as D5 of the video layer forms another video packet with a packet header affixed at its leading position.

Video packets thus packetized are multiplexed with audio packets and subtitle packets to thereby form the MPEG2 system stream shown in FIG. 15A.

FIG. 16 shows the contents of a picture header, and FIG. 17 shows the contents of a picture coding extension.

In the picture header, there are items of information such as a unique picture_start_code, temporal_reference (TR) (which is a time-series serial number given per picture), and picture_coding_type (I-, P- or B-picture).

In the picture coding extension, there are items of information such as a unique extension_start_code, a unique extension_start_code_identifier, picture_structure, top_field_first, progressive_frame, etc.

As for the picture data, two data structures may coexist: a frame structure where one picture is composed of one frame and a field structure where one picture is composed of two fields. Whether the picture data has a frame structure of one frame per picture or a field structure of two fields per picture can be identified from the following three items of information, i.e., (1) presence of GOP header, (2) temporal_reference (TR) in picture header, and (3) picture_structure in picture coding extension.

FIG. 18 is a block diagram illustrating one example of data decoding apparatus adapted to perform special reproduction of data, such as slow picture playback, fast playback, reverse playback and the like. An optical disk 1 is rotatable by a spindle motor (not shown) at a predetermined rotation rate, and a laser beam is projected from a pickup 2 to a track on the optical disk 1, so that the MPEG compressed digital data recorded on the track is read therefrom. The digital data is processed by a demodulator circuit 3 which demodulates eight to fourteen modulation (EFM) and supplied to a sector detection circuit 4. The output of the pickup 2 also is supplied to a phase-locked loop (PLL) circuit 9, where a clock signal is reproduced and supplied to the demodulator circuit 3 and to the sector detection circuit 4.

The digital data recorded on the disk 1 includes multiplexed streams recorded in units of a fixed-length sector, with a sector sync and a sector header affixed to the beginning of each sector. The sector detection circuit 4 detects each of the sectors from the sector sync and the sector address from the sector header; and this information is supplied to a control circuit 6.

The demodulated digital data is supplied via the sector detection circuit 4 to an ECC (error correction) circuit 33 which executes error detection and correction. The ECC circuit 33 supplies error-corrected data to a ring buffer 5 to be written therein under control of the control-circuit 6.

The output of the ECC circuit 33 also is supplied to a stream detector 50, which determines the picture type from the data stream picture header read from the disk 1 in a special reproduction mode and then supplies picture type information to the control circuit 6. In response to this information, the control circuit 6 executes its control operation in such a manner that, in the special reproduction mode, the data of the I-picture and the data of the succeeding two P-pictures are written in the ring buffer 5.

A focus control circuit (not shown) and a tracking servo circuit 8 control focusing and tracking of the pickup 2, respectively, under the control of a system controller (not shown) in response to a focus error signal and a tracking error signal obtained from the information read by the pickup 2.

In accordance with the sector address of each sector detected by the sector detection circuit 4, the control circuit 6 designates, by a write pointer WP, a write address for writing the corresponding sector in the ring buffer 5. Moreover, in accordance with a code request signal obtained from a video code buffer 10 (FIG. 18B), the control circuit 6 further designates, by a read pointer RP, a read address of the data written in the ring buffer 5. The control circuit 6 is adapted to read the data from the position of the read pointer RP and supplies the read data to a demultiplexer 32.

Since the coded data recorded on the disk 1 comprises multiplexed video, audio and subtitle data, the demultiplexer 32 separates the data read thereto from ring buffer 5 into the video data, the audio data and the subtitle data, and then supplies the respective data to a video decoder 20 (FIG. 18B), an audio decoder (not shown), and a subtitle decoder (not shown). The video decoder 20 stores the video data in the video code buffer 10.

Thereafter, the data stored in the video code buffer 10 is supplied to a picture header detector 34 which detects the picture header. The detected picture header information is further used to identify the picture type (I, P or B picture) of the video data and the temporal reference (TR) which signifies the frame order in the GOP. A picture data selection circuit 35 selects only the I-picture and the P-picture as identified by the picture type information supplied from the picture detector 34 in the special reproduction mode, and supplies the selected picture data to an inverse VLC (variable length coding) circuit 11. In a normal reproduction mode, the picture data selection circuit 35 is controlled to deliver all of the picture data to inverse VLC circuit 11 without any pre-selection.

The data supplied to the inverse VLC circuit 11 is processed using inverse VLC; and then is supplied to a dequantizer 12. Code request signals are returned to the video code buffer 10 from the inverse VLC circuit to permit new data to be transferred from the video code buffer 10.

Further, the inverse VLC circuit 11 outputs a quantization step size to the dequantizer 12 and outputs motion vector information to a motion compensator 15. The quantization step size and motion vector information are included with the video data. The dequantizer 12 dequantizes the input data in accordance with the designated quantization step size and outputs the dequantized data to an inverse DCT (discrete cosine transform) circuit 13. The inverse DCT circuit 13 processes the dequantized data using inverse DCT to recover video information, and supplies the recovered video information to an adder 14.

The adder 14 adds the output of the inverse DCT circuit 13 and the output of the motion compensator 15 in accordance with the picture type (I, P or B) and supplies the result, i.e., motion-compensated video data, to a frame memory bank 16.

Thereafter, the data read from the frame memory bank 16 is rearranged in the original frame order (as shown in FIG. 14A by switch 16E). The rearranged data is supplied to a digital-to-analog (D/A) converter 17 which converts the data into an analog video signal to be displayed on a display device 18.

Returning to FIG. 18A, the output of the ECC circuit 33 is supplied to a stream detector 50 which detects the picture type from the stream data read from the disk 1 and supplies the picture type information to the control circuit 6. In response to this information, the control circuit 6, in the special reproduction mode, writes into the ring buffer 5, the data of the I-picture and the succeeding two P-pictures.

Accordingly, three frames corresponding to the I- and two P-pictures at the beginning of each GOP are written at high speed into the ring buffer 5, and this data can be acquired and decoded by the decoder 20 at any desired timing, thereby enabling efficient decoding of data in the special reproduction mode.

For example, suppose that a reverse reproduction is started with the P-picture $P_3$ of the original frame order shown in FIG. 14A. It is necessary to display the decoded pictures in the following order:

$$P_3 \to B_7 \to B_6 \to P_2 \to B_5 \to B_4 \to P_1 \to B_3 \to B_2 \to P_0 \to B_1 B_0 \to I_0 \to \ldots$$

However, since each P-picture is coded by inter-picture prediction as described, the pictures $I_0$, $P_0$, $P_1$ and $P_2$ need to be decoded before decoding the P-picture $P_3$. Similarly, the P-pictures $P_2$ and $P_3$ need to be decoded prior to decoding the B-picture $B_7$. Therefore, if reverse reproduction is to be performed by decoding each picture merely once, as in normal reproduction, it becomes necessary to employ a frame memory bank 16 of great capacity which is capable of storing as many frames as there are pictures constituting a GOP.

The storage capacity of the frame memory bank 16 must be increased beyond what is required in a normal reproduction mode to meet such requirement. Further, the decoded data must be sequentially stored in the frame memory bank to deliver the pictures in the proper order of reverse reproduction.

Although other techniques of reverse reproduction may be adopted to perform merely with the I- and P-pictures thus skipping the B-pictures, the necessity of storing more frames than what is required for normal reproduction still exists.

For this reason, the data decoding apparatus of FIG. 18 operates to perform reverse reproduction using the same frame memory bank as utilized in normal reproduction, i.e., using three memory elements in the example of FIG. 18 to store one I-picture and two temporally succeeding P-pictures. The stream detector 50 provided for this purpose writes the I-picture and the two succeeding P-pictures in the ring buffer 5. However, this makes the construction and operation of the steam detector 50 for detecting the I-picture and the two succeeding P-pictures more complicated.

FIG. 15A shows the packetized (multiplexed) MPEG2 system stream. When a packet of the MPEG2 video stream is defined at a position D3 as shown in FIG. 15C during the packetization process, the picture header and the picture coding extension of the picture data (V+2) are spread over two packets, as shown in FIG. 15B.

If the picture header and the picture coding extension are spread over two video packets, it becomes necessary to detect two video packets to obtain the requisite items of information of the picture. Further, and as shown in FIG. 15A, another packet (e.g., audio packet) may exist between the two video packets to complicate the detection process, thereby complicating the construction and operation of the stream detector 50.

According to the MPEG2 technique, video data in a frame structure where one picture is composed of one frame, and video data in a field structure, where one picture is composed of two fields, can be intermingled. Since a picture header is affixed to every field, the picture headers and the picture coding extensions of two consecutive pictures must be read to determine the data structure of the video data.

Therefore, a determination is made to ascertain whether the picture data is formed in the frame structure or the field structure on the basis of the aforementioned three items of information, i.e., (1) presence of GOP header; (2) temporal reference (TR) in the picture header; and (3) picture_structure information in picture coding extension.

A detailed explanation will be given below with regard to a method of differentiating between a frame structure and a field structure.

FIGS. 19A and 19B show video data in the field structure and frame structure formats, respectively. In the field structure format, one frame of video data is composed of two fields of picture data, to each of which are affixed a picture header and a picture coding extension. In the frame structure format, one frame of video data is composed of one frame of picture data to which a picture header and a picture coding extension are affixed.

In the field structure format, the numerical values of the TR information in the respective picture headers of the picture data pair are set equal to each other. The picture_structure information in the picture coding extension is "01" and "10" for Top Field and Bottom Field, respectively, as shown in FIG. 20. Further, the picture_structure information in the picture coding extension of the frame structure is "11" as shown in FIG. 20.

The format (field or frame structure) of the picture data may be ascertained by first reading the GOP header at the GOP start position and then reading the picture_structure information of the picture coding extension at the beginning of that picture data.

Although the picture data in the frame structure can be loaded into the ring buffer 5 (FIG. 18A) by detecting a single frame, it is difficult to similarly load the video data in the field structure, where a pair of picture data constitutes one frame of video data, because the paired picture data must be detected before it can be properly loaded. Consequently, the TR information in each picture header is read to find two picture data units with numerically equal values of TR. When such a pair is found, they are identified as paired picture data and then are loaded.

The paired field-structure picture headers are arranged in either of two different orders: top/bottom and bottom/top. Such arrangements will now be described with reference to FIG. 21. A GOP header (GOP H), an I-picture of frame structure, a B-picture of field structure, another B-picture of field structure, a GOP header spaced apart therefrom, and an I-picture of field structure, a GOP header, another I-picture of field structure . . . and so forth are sequentially recorded.

For example, where a total of three frames (one I-picture and two succeeding P-pictures) are loaded into ring buffer 5 (FIG. 18A), the I-picture in frame structure next to the top (first) GOP header is detected and identified from the GOP header, the picture_coding_type in the picture header, and the picture_structure information ("11" in the case of frame structure) in the picture coding extension at the beginning of the picture data.

When access is made for playback at the position identified as random access 1 in the bit stream, the picture header and the picture coding extension of the first field-structure B-picture are read out. At this time, the TR expressed as "0" is also read out. Subsequently the picture header and the picture coding extension of the second field-structure B-picture are read out as well as the TR expressed as "0". Since the TR value of the two field-structure B-pictures are equal, they are detected as paired data.

When access is made at the position identified as random access 2 in the bit stream, the picture header and the picture coding extension of the first picture are read along with the TR expressed as "0". Subsequently the picture header and the picture coding extension of the next picture are read out along with the TR expressed as "1". Since the respective numerical values of the TR are not coincident with each other, the data of the two field-structure pictures are not detected as paired data.

If access is made at the position identified as random access 3 in the bit stream, the respective numerical values of the TR in the two picture headers are coincident (TR=1) with each other as in the foregoing case of random access 1, thus the pictures are detected as a pair. If a picture structure in the picture coding extension of "01" or "10" is detected, it is regarded as a field structure, and a paired data is detected.

If access is made at the position identified as random access 4 in the bit stream, the picture header and the picture coding extension of the first picture are read out along with the TR expressed as "0". This picture data is regarded as a field-structure I-picture in accordance with the picture coding type information in the picture header and the picture_structure information in the picture coding extension.

After subsequent detection of the GOP header, the picture header and the picture coding extension of the next picture are read out along with the TR expressed as "0". Here, the respective numerical values of the TR of the two consecutive pictures are coincident with each other, but these two pictures are not considered as paired because there exists a GOP header between the two pictures. It should be noted that the TR is reset to "0" if a GOP header exists and no GOP header is interposed between a paired picture.

As described, the stream detector 50 executes a process of detecting various items of information relative to the pictures in accordance with the GOP header, the picture headers, and a plurality of flags of the picture coding extensions, to load the picture data into the ring buffer 5. However, this processing routine is extremely complex making it difficult to construct the stream detector 50.

The manner in which the stream detector 50 detects the completion of the loading process is explained in conjunction with the flow chart shown in FIG. 22. It is assumed in this flow chart that a random access is made to an entry sector written immediately anterior to an I-picture so that a proper picture can be obtained instantly in response to the random access.

At step S10, the stream detector searches for the picture_start_code in the picture_header to detect the picture header of the I-picture and inquiry is made at step S12 to determine whether the picture_start_code has been detected. If the inquiry at step S12 is answered in the affirmative, that is, if the picture_start_code is detected, the operation proceeds to step S14. However, if the inquiry at step S12 is answered in the negative, that is, if no picture_start_code is detected, the process at step S12 is repeated until the picture_start_code is detected.

At step S14, the temporal reference is read from the detected picture header and its numerical value is stored in a register as TR0.

At step S16, another search (SRCH) for the picture_start_code in the picture header is made to detect the next picture and inquiry is made at step S18 to determine whether the picture_start_code has been detected. If the inquiry at step S18 is answered in the affirmative, that is, if the picture_start_code is detected, the operation proceeds to step S20. However, if the inquiry at step S18 is answered in the negative, the process at step S18 is repeated until the picture-start-code is detected.

Inquiry is made at step S20 to determine whether a GOP header has been detected in the picture start code, thereby to determine if the detected picture data is part of a pair. If the inquiry at step S20 is answered in the negative, that is, if no GOP header is detected, the operation proceeds to step S22. However, if this inquiry is answered in the affirmative, that is, if the GOP header is detected, the operation advances to step S26 because the existence of a GOP header between the picture data eliminates the possibility that these picture units are paired.

When the temporal reference is read from the detected picture header, its numerical value is stored in a register as TR1 as represented by step S22, and the operation advances to the inquiry at step S24 to determine whether the numerical values of the TR stored respectively in the register TR0 and TR1 are equal. If the inquiry at step S24 is answered in the affirmative, that is, if there is a coincidence of the two numerical values, the operation returns to step S16 and the processes discussed above in conjunction with steps S16 to S24 are repeated. It will be appreciated that the coincidence of two numerical values signifies that a picture data pair has been detected.

However, if the inquiry at step S24 is answered in the negative, that is, if the numerical values of the TR are not equal, the operation proceeds to step S26. Here, the picture header of the next picture is detected; and the picture coding type read from the picture header is stored in the register. The operation then advances to the inquiry at step S28 to determine whether the stored picture coding type represents a B-picture. If the inquiry at step S28 is answered in the affirmative, that is, if the detected picture is a B-picture, the operation returns to step S16 because the B-picture is not being sought; and the processes discussed above in conjunction with steps S16 to S28 are repeated to detect the next picture.

However, if the inquiry at step S28 is answered in the negative, that is, if the detected picture is not a B-picture, the temporal reference in the detected picture header is read and its numerical value is stored in the register as TR2, as represented by step S30. It will be appreciated that this detected picture is the first P-picture appearing after the I-picture.

At step S32, another search (SRCH) for the picture_start_code in the picture header is made to detect the next picture and inquiry is made at step S34 to determine whether the picture_start_code has been detected. If the inquiry at step S34 is answered in the affirmative, the operation proceeds to step S36. However, if inquiry at step S34 is answered in the negative, that is, if no picture_start_code has been detected, the process at step S34 is repeated until the picture_start_code is detected.

Inquiry is made at step S36 to determine whether a GOP header has been detected during the search for the picture_start_code, thereby to determine if the detected picture data is part of a pair. If the inquiry at step S36 is answered in the negative, that is, if no GOP header is detected, the operation proceeds to step S38. However, if the inquiry at step S36 is answered in the affirmative, that is, if a GOP header is detected, the operation advances to step S42 because the existence of a GOP header between picture units eliminates the possibility that these picture units are paired.

When the temporal reference is read from the detected picture header at step S38, its numerical value is stored in the register as TR3 and the operation advances to the inquiry at step S40 to determine whether a coincidence is attained between the numerical values of the TR stored respectively in the register as TR2 and TR3. If the inquiry at step S40 is answered in the affirmative, that is, if the two numerical values are equal, the operation returns to step S32 and the processes discussed above in conjunction with steps S32 to S40 are repeated. It will be appreciated that the coincidence of two numerical values signifies that a picture data pair has been detected.

However, if the inquiry at step S40 is answered in the negative, that is, if the numerical values of the TR are not coincident, the operation proceeds to step S42 to read the picture type. The operation then advances to the inquiry at step S44 to determine whether the stored picture coding type represents a B-picture. If the inquiry at step S44 is answered in the affirmative, that is, if the detected picture is a B-picture, the operation returns to step S32 because the B-picture is not being sought; and the processes discussed above in conjunction with steps S32 to S44 are repeated to detect the next picture.

However, if the inquiry at step S44 is answered in the negative, that is, if the detected picture is not a B-picture, the temporal reference detected in the picture header is read and its numerical value is stored in the register as TR4, as represented by step S46. It will be appreciated that this detected picture is the second P-picture appearing after the I-picture.

Proceeding to step S48, another search (SRCH) for the picture_start_code in the picture header is made to detect the next picture and inquiry is made at step S50 to determine whether the picture_start_code has been detected. If the inquiry at step S50 is answered in the affirmative, that is, if the picture_start_code is detected, the operation proceeds to step S52. However, if the inquiry at step S50 is answered in the negative, the process at step S50 is repeated until the picture_start_code is detected.

Inquiry is made at step S52 to determine whether a GOP header has been detected during a search for the picture_ start_code, thereby to determine if the detected picture data is part of a pair. If the inquiry at step S52 is answered in the negative, that is, if no GOP header is detected, the operation proceeds to step S54. However, if the inquiry at step S52 is answered in the affirmative, that is, if a GOP header is detected, the loading of the picture data into the ring buffer is completed and the process is terminated.

When the temporal reference is read from the detected picture header and its numerical value is stored in the register as TR5, as represented by step S54, the operation advances to the inquiry at step S56 to determine whether a coincidence is attained between the numerical values of the TR stored respectively as TR4 and TR5. If the inquiry at step S56 is answered in the affirmative, that is, if there is coincidence in the two numerical values, the operation returns to step S48 and the processes discussed above in conjunction with steps S48 to S56 are repeated. However, if the inquiry at step S56 is answered in the negative, that is, if the two numerical values of the TR are not equal, the loading of the picture data is complete and the process is terminated.

Thus, the stream detector 50 can load a bit stream by executing the above processing routine to load an I-picture and two succeeding P-pictures. However, as indicated by its lengthy description, it is quite onerous to execute this complex processing routine.

OBJECTS OF THE INVENTION

Therefore, it is an object of the present invention to provide method and apparatus for coding data to perform special reproduction, e.g., fast forward and fast reverse reproduction, which overcomes the shortcomings of the above described technique, i.e., the aforementioned intricate operations.

Another object of the present invention is to provide method and apparatus for decoding data to perform special reproduction which overcomes the shortcomings of the above described technique.

A further object of the present invention is to provide a recording medium for use in conjunction with processor-controlled apparatus to perform special reproduction without requiring the processor-controlled apparatus to execute the aforementioned intricate operations.

Various other objects, advantages and features of the present invention will become readily apparent from the ensuing detailed description, and the novel features will be particularly pointed out in the appended claims.

SUMMARY OF THE INVENTION

In accordance with one embodiment of the present invention, apparatus and method of recording coded pictured data on a recording medium are provided. The picture data is coded using intra-picture coding and/or predictive coding to provide one I-picture and one succeeding P-picture. Positional information representing the position of the P-picture relative to the I-picture is generated, and the I-picture, the P-picture, and the positional information are recorded on the recording medium.

As one aspect of the present invention, the positional information represents the data length in bytes from the I-picture to the end of the P-picture.

In accordance with another embodiment of the present invention, apparatus and method are provided for reproducing coded picture data from a recording medium. Positional information representing the position of the P-picture relative to an I-picture is detected, and a data stream inclusive of the I-picture, the P-picture, and the positional information is generated. The data stream is decoded and displayed.

In accordance with yet another embodiment of the present invention, a recording medium is provided for use in conjunction with a processor-controlled apparatus where one I-picture, one P-picture, and positional information representing the position of the P-picture relative to the I-picture are recorded on the medium and used by the processor-controlled apparatus to perform special reproduction relatively easily and straight forwardly.

BRIEF DESCRIPTION OF THE DRAWINGS

The following detailed description, given by way of example, and not intended to limit he present invention solely thereto, will best be understood in conjunction with the accompanying drawings in which:

FIG. 4 shows a syntax of a program stream map (PSM);

FIG. 5 shows a syntax of elementary stream descriptors;

FIG. 6 shows a syntax of an ip_ipp_descriptor;

FIG. 7 shows a syntax of global descriptors;

FIGS. 8A and 8B are a block diagram illustrating one embodiment of the data decoding apparatus of the present invention;

FIGS. 9A to 9C are diagrams showing an example of the order of video data to which reference will be made in describing how video data is read in a fast reverse reproduction mode of the data decoding apparatus of FIGS. 8A and 8B;

FIG. 10 is read/write timing diagram to which reference will be made in describing the fast reverse reproduction mode of the data decoding apparatus of FIGS. 8A and 8B;

FIGS. 11A to 11C are diagrams showing an example of the order of video data to which reference will be made in describing how video data is read in a fast forward reproduction mode of the data decoding apparatus of FIGS. 8A and 8B;

FIGS. 12A to 12C are diagrams showing another example of the order of video data to which reference will be made in describing how video data is read in a fast reverse reproduction mode of the data decoding apparatus of FIGS. 8A and 8B;

FIGS. 15A to 15C are schematic representations of an MPEG video stream;

FIG. 16 shows the structure of a picture header in the MPEG system;

FIG. 17 shows the structure of a picture coding extension in the MPEG system;

FIGS. 18A and 18B are a block diagram illustrating data decoding apparatus;

FIGS. 19A and 19B are schematic representations of the structure of a video data in a frame format and a field format, FIG. 20 is a table illustrating the contents of a picture structure;

DESCRIPTION OF THE PREFERRED EMBODIMENTS

Hereinafter preferred embodiments of the present invention are described in detail with reference to the accompanying drawings.

Figure 1:
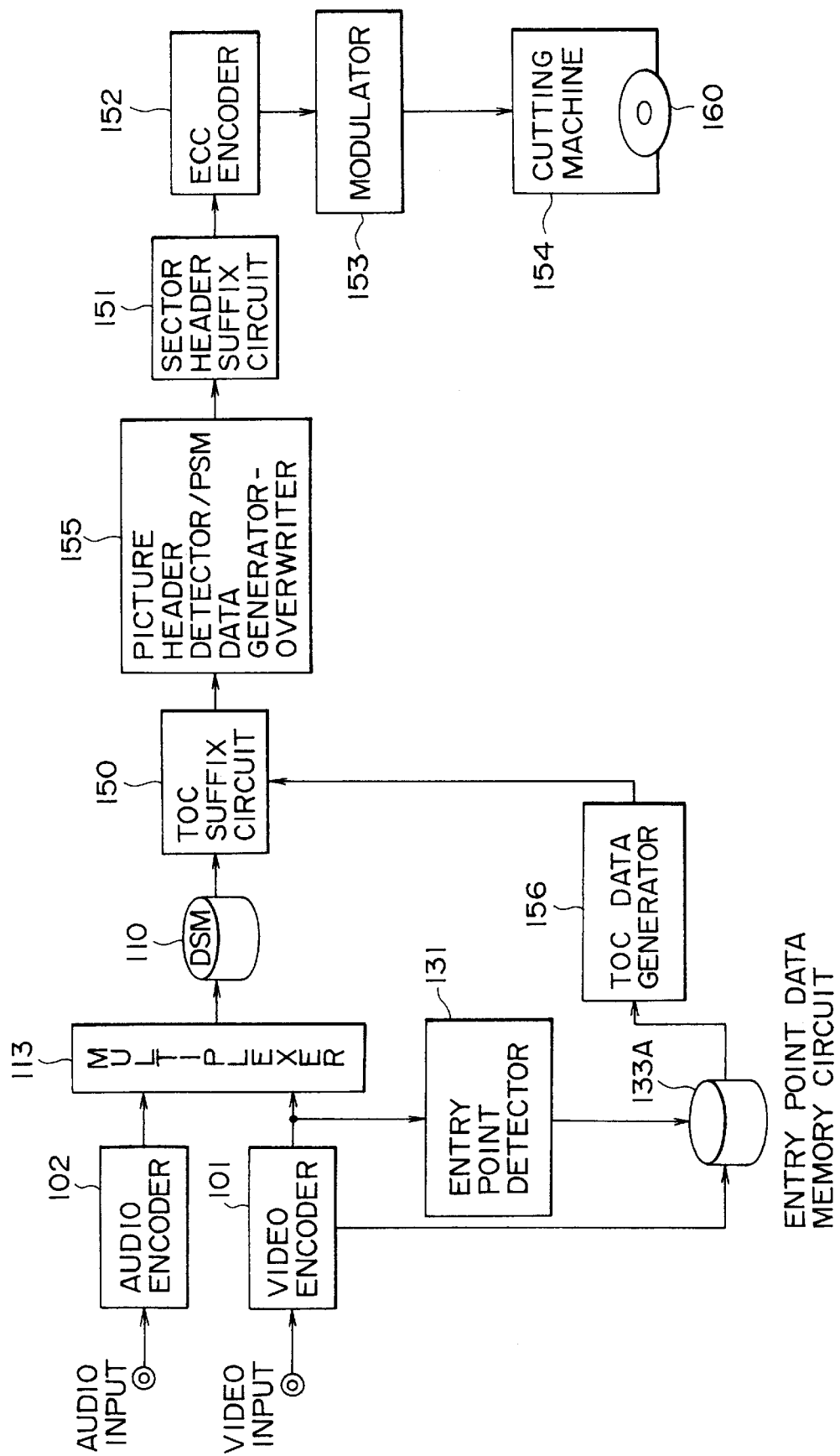
FIG. 1 is a block diagram illustrating one embodiment of the data coding apparatus of the present invention.

FIG. 1 is a block diagram showing an embodiment of the data coding apparatus of the present invention. An audio encoder 102 compression-encodes an input audio signal supplied to its audio input terminal and a video encoder 101 compression-encodes an input video signal supplied to its video input terminal. The encoded audio and video signals are supplied to the multiplexer 113. It is assumed that a stream outputted from the audio encoder 102 is an MPEG2 audio stream (audio layer) and a stream outputted from the video encoder 101 is an MPEG2 video stream (video layer), the latter being shown in FIG. 15C.

The multiplexer 113 packetizes the input MPEG2 video stream and MPEG2 audio stream by time-division multiplexing to form the system stream, shown in FIG. 15A.

Although not shown, a subtitle stream may also be inputted to the multiplexer 113 and may be multiplexed with the video stream and the audio stream. In such case, the MPEG2 system stream outputted from the multiplexer 113 is as shown in FIG. 15A.

An input terminal of an entry point data memory circuit 133A is connected to the video encoder 101; and an entry point detector 131 enables the entry point data memory circuit 133A to store an entry point (data relative to an I-picture generation point) received from the video encoder 101.

A table of contents (TOC) data generator 156 generates TOC data based on the contents of the entry point data memory circuit 133A. The TOC data include a name of the disk on which the video and audio data are recorded, the name of each chapter recorded on the disk, the start address of each chapter on the disk, the reproduction time of the disk, the reproduction time of each chapter, the start address of each entry sector and the like.

The packetized stream outputted from the multiplexer 113 is temporarily stored in a DSM (Digital Storage Medium) 110 and then supplied to a TOC suffix circuit 150. The TOC suffix circuit 150 adds the TOC data to the packetized stream and supplies the same to a picture header detector/program stream map (PSM) data generator-overwriter 155.

The picture header detector/PSM data generator-overwriter 155 detects a picture header and generates PSM data which includes information representing the data length in bytes from the beginning of an entry sector to the end of the first-appearing P-picture and/or from the beginning of the entry sector to the end of the second-appearing P-picture. Preferably, PSM data includes information representing the data length in bytes from the beginning of an I-picture to the end of the first-appearing P-picture and/or from the beginning of an I-picture to the end of the second-appearing P-picture. The generated PSM data are written into an area in the entry sector previously reserved therefor in the packetized stream by the multiplexer 113. A detailed description of the PSM data will be provided later herein.

The output of the picture header detector/PSM data generator-overwriter 155 is supplied to a sector header suffix circuit 151, where the packetized stream is divided into sectors with a sector header added to each of the sectors.

The output of the sector header suffix circuit 151, that is, the video and audio data together with all of the other data added thereto, as described above, is encoded for error correction by an ECC encoder 152.

Thereafter, a modulator 153 modulates the encoded data from the ECC encoder 152 using eight to fourteen modulation (EFM) and the modulated data is supplied to a cutting machine 154. The cutting machine 154 forms pits in a master disk 160 in accordance with the data supplied from the modulator 153, whereby the packetized stream data are written on a master DVD disk 160. A replica DVD disk is produced, for example, through press-molding of this master disk 160.

Thus, the data coding apparatus of FIG. 1 encodes and packetizes, using time-division multiplexing, an audio signal and a video signal inputted thereto to produce a packetized stream. Further, the picture header detector/PSM data generator-overwriter 155 generates and writes PSM data into the packetized stream. The packetized stream is recorded on the master DVD disk 160.

Figure 2:
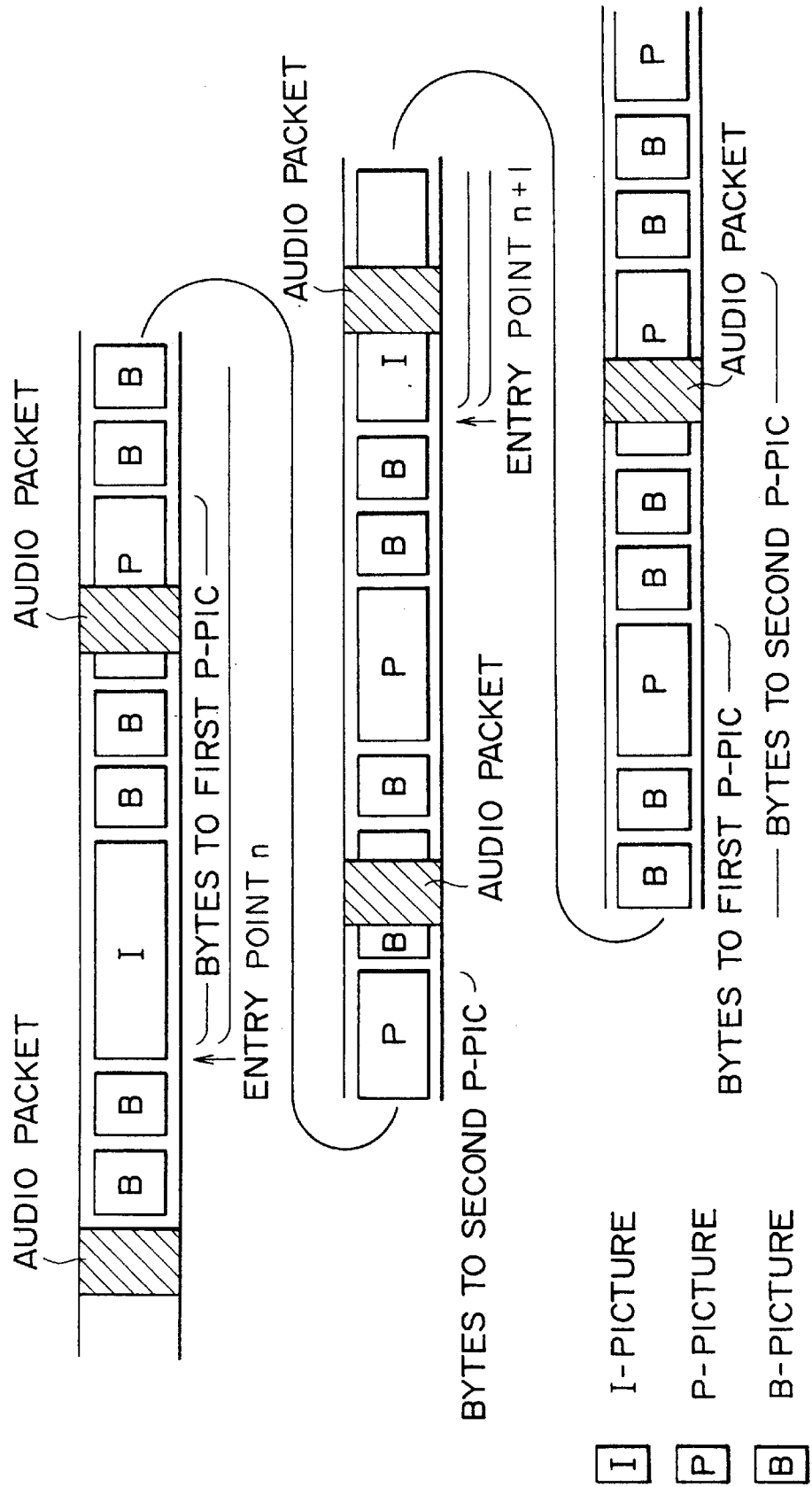
FIG. 2 shows an example of a packetized stream coded by the data coding apparatus of FIG. 1.

FIG. 2 shows an example of the packetized stream, e.g., MPEG2 system stream, outputted from the picture header detector/PSM data generator-overwriter 155. For simplicity, only packetized video data and audio data are shown. Audio data is inserted in certain portions of the MPEG2 system stream to insure that the sound is not interrupted during reproduction, and video data of I-, P- and B-pictures is inserted among the audio data.

An entry point signifies the top (or beginning) position of an I-picture, and a sector including such an entry point is termed an entry sector. In FIG. 2, the positions of such entry points are indicated as entry point n, entry point n+1, . . . and so forth. The position where entry point information is written is predetermined to be immediately anterior to an I-picture, so that a complete picture can be displayed instantly when a pickup has read the data from the entry sector.

Audio data may exist between the entry point information and an I-picture, but P- and B-pictures do not exist therebetween.

Figure 3:
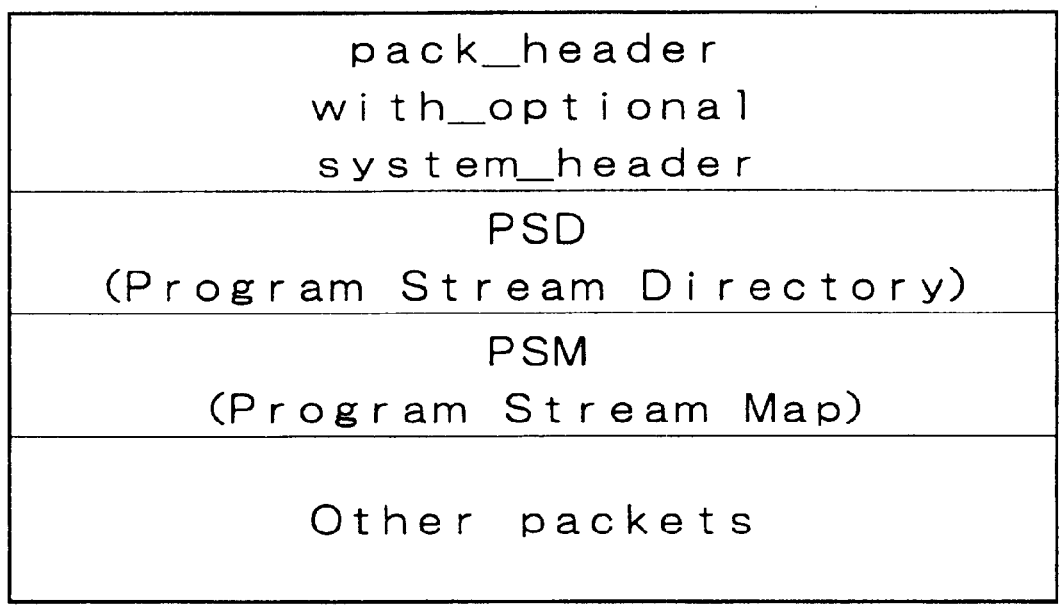
FIG. 3 shows a layout of entry point information.

FIG. 3 shows a layout of entry point information. The entry point information includes a pack header with an optional system header, a PSD (Program Stream Directory), a PSM (Program Stream Map) and other packets.

FIG. 4 shows the syntax of the PSM. The PSM includes a packet_start_code_prefix of 24 bits forming a unique code, a map_stream_id of 8 bits, program_stream$_{13}$ info composed of an arbitrary number of global descriptors, a stream_type, and elementary_stream_info including an arbitrary number of elementary stream descriptors.

FIG. 5 shows the syntax of the elementary stream descriptors which are composed of dvd_video_descriptor and ip_ipp_descriptor if the stream is video data, or composed of dvd_audio_descriptor and ISO_639_language_descriptor if the stream is audio data, or composed of dvd_subtitle_descriptor and ISO_639_language_descriptor if the stream is subtitle data. Also, other items of information are shown in FIG. 5.

As shown in FIG. 6, the ip_ipp_descriptor consists of a descriptor_tag of 8 bits signifying a descriptor of ip_ipp, a description_length of 8 bits signifying the length of the descriptor, bytes_to_first_P_pic of 32 bits signifying the number of bytes from the first byte of the present entry sector to the last byte of a first-appearing P-picture, and bytes_to_second_P_pic of 32 bits signifying the number of bytes from the first byte of the present entry sector to the last byte of the second-appearing P-picture.

The bytes_to_first_P_pic and bytes_to_second_P_pic represent the data lengths, as shown in FIG. 2. It is appreciated that the number of offset bytes indicated by the information of bytes_to_first_P_pic and bytes_to_second_P_pic includes not only I- and P-pictures but also intermediary B-pictures and audio packets, as shown in FIG. 2.

FIG. 7 shows the syntax of the global descriptors of FIG. 4. The PSD included in each entry sector represent the distances from the present entry sector to the preceding entry sector and the following entry sector, and the distances to the entry sectors after a lapse of one second, three seconds and so on. These distances are referred to as offset addresses.

Figure 8B:
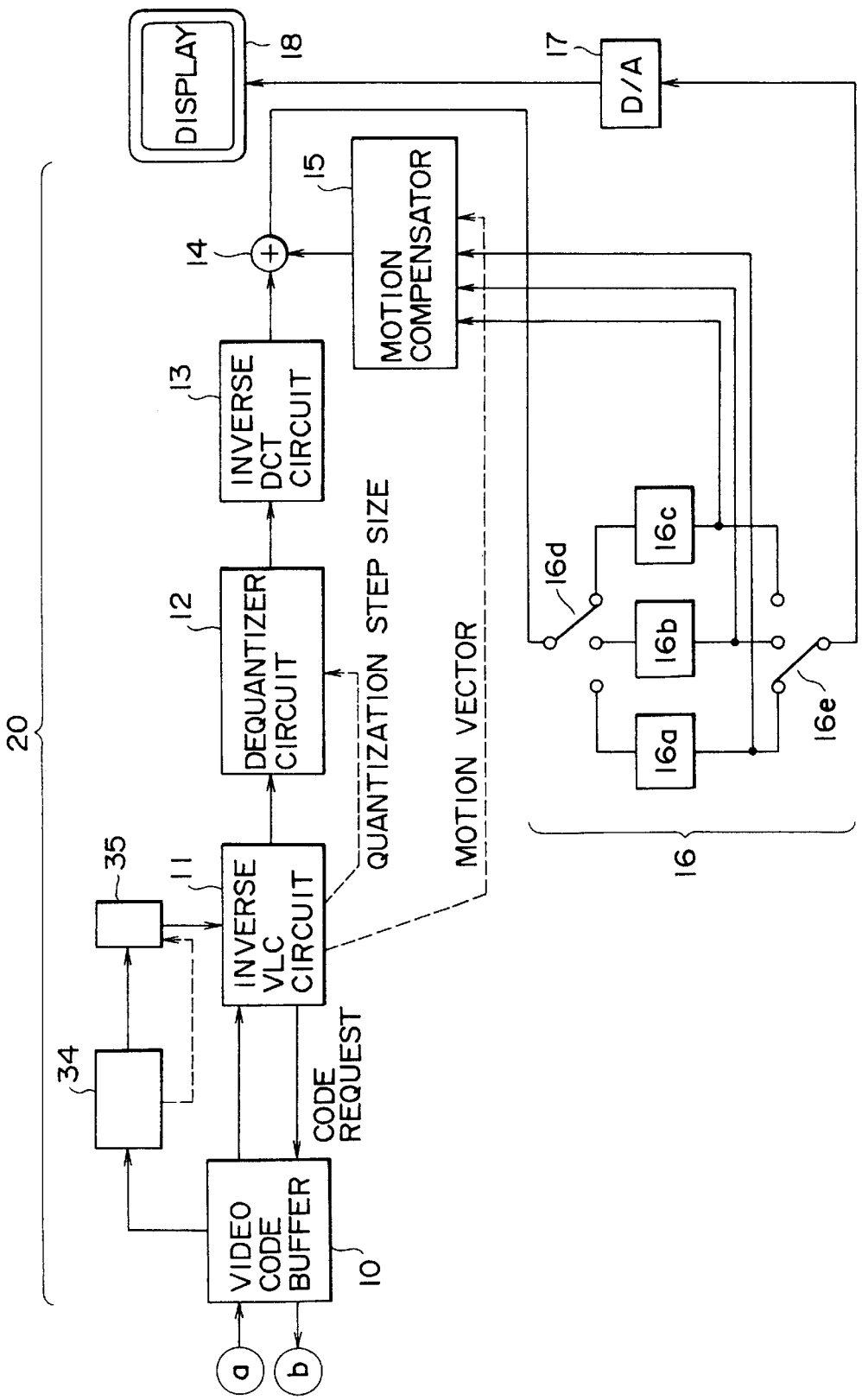

FIGS. 8A and 8B are a block diagram of a preferred embodiment of the data decoding apparatus of the present invention. For simplicity, elements shown in FIGS. 8A and 8B corresponding to those shown in FIGS. 18A and 18B are denoted by the same reference numerals.

An optical disk 1 is rotated at a predetermined rotation rate by a spindle motor (not shown), and a laser beam is projected from a pickup 2 to a track on the optical disk 1, so that the MPEG compressed digital data recorded on the track are read therefrom. The digital data is EFM-demodulated by a demodulator 3 and inputted to a sector detector 4. The output of the pickup 2 also is supplied to a phase-locked loop (PLL) circuit 9, which recovers a clock signal that is supplied to both the demodulator 3 and the sector detector 4.

As discussed above, the digital data is recorded on the disk 1 in units of fixed-length sectors, wherein a sector sync and a sector header are recorded at the beginning of each sector. The division of sectors is determined from the detection of the sector sync and a sector address from the sector header, which are supplied to a control circuit 6. Preferably the control circuit is microprocessor-implemented and effects processor control over the illustrated apparatus.

The demodulated output is supplied via the sector detector 4 to an ECC (error correction) circuit 33 which executes error detection and correction. The ECC circuit 33 supplies the error-corrected data to a ring buffer 5 to be written therein under the control of the control circuit 6.

The output of the ECC circuit 33 also is supplied to a PSM detector 40. In the special reproduction mode, the PSM detector 40 detects the PSM information in the entry sector from the stream data read from the disk 1 and supplies the detected PSM information to the control circuit 6. The control circuit 6 uses this PSM information to control the writing (or loading) of I- and P-pictures into the ring buffer 5 in a special reproduction mode according to the information relating to the number of offset bytes the in ip_ipp_ descriptor to insure that the length information in the stream data from an I-picture after the entry sector to the second P-picture is written into the ring buffer 5.

A focus control circuit (not shown) and a tracking servo circuit 8 control focusing and tracking of the pickup 2, respectively, under the control of a system controller (not shown) in accordance with a focus error signal and a tracking error signal obtained from the information read out by the pickup 2.

On the basis of the sector address of each sector detected by the sector detector 4, the control circuit 6 designates, by a write pointer WP, a write address for writing the proper sector into the ring buffer 5. Further, on the basis of a code request signal obtained from a video code buffer 10 (FIG. 8B), the control circuit 6 designates, by a read pointer RP, a read address from which the data is read from the ring buffer 5. The data read from the position designated by the read pointer RP is supplied to a demultiplexer 32.

Since the coded data recorded on the disk 1 comprises multiplexed packetized video data, audio data and subtitle data, the demultiplexer 32 separates the data supplied thereto into the video data, audio data and subtitle data, and then supplies the respective data to a video decoder 20 (FIG. 8B), an audio decoder (not shown), and a subtitle decoder (not shown).

As a result, the video data read out from the ring buffer 5 is stored in the video code buffer 10 of the video decoder. The stream data from an I-picture to the second succeeding P-picture contains packets other than the video packets, as shown in FIG. 2. In the special reproduction mode, any unnecessary data, that is, packets other than the video data are excluded by the demultiplexer 32.

The data stored in the video code buffer 10 is supplied to a picture header detector 34 where the picture header thereof, the picture type information signifying the picture type I, P or B, and the temporal reference (TR) signifying the frame order in the GOP are detected. The detected picture type information is supplied to a picture data selector 35, where only the I- and P-pictures are selected in the special reproduction mode; and the selected pictures are supplied to an inverse VLC circuit 11. In the normal reproduction mode, the picture data selector 35 is controlled to output all of the picture data without performing any pre-selection.

The data supplied to the inverse VLC circuit 11 is processed using inverse VLC therein; and then supplied to a dequantizer 12. Code request signals are returned to the video code buffer 10 from the inverse VLC circuit to permit new data to be transferred from the video code buffer 10.

Further, the inverse VLC circuit 11 outputs a quantization step size to the dequantizer 12 and outputs motion vector information to a motion compensator 15. The dequantizer 12 dequantizes the input data in accordance with the specified quantization step size and outputs the dequantized data to an inverse DCT circuit 13. The inverse DCT circuit 13 processes the quantized data using inverse DCT and supplies the processed data to an adder 14.

The adder 14 adds the output of the inverse DCT circuit 13 and the output of the motion compensator 15 in accordance with the picture type (I, P or B) and supplies the resultant motion-compensated video data to a frame memory bank 16.

Figure 14A:
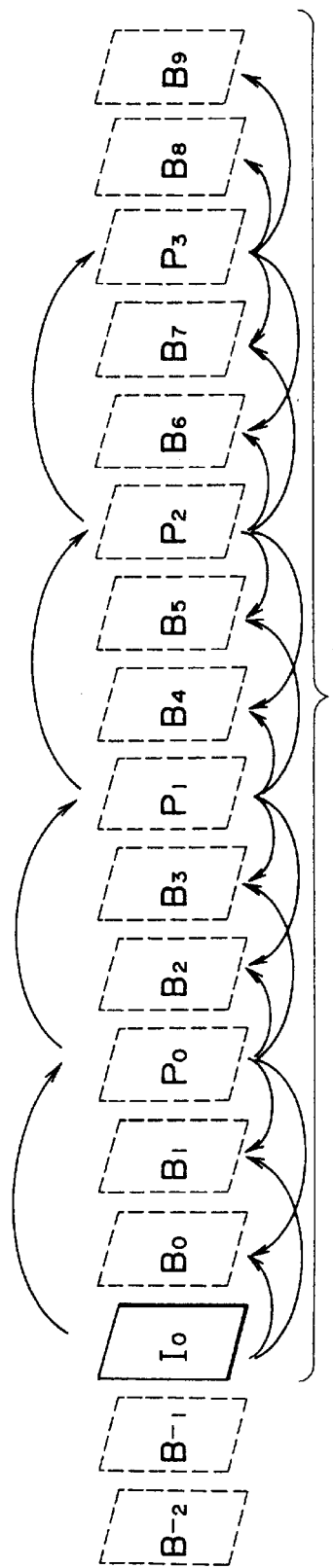
FIGS. 14A and 14B are schematic representations of structures of original inter-frame prediction pictures and record frames of pictures in the MPEG system.

Thereafter the data read from the frame memory bank 16 is rearranged in the original frame order shown in FIG. 14A by switch 16e. The rearranged data is supplied to a digital-to-analog (D/A) converter 17 to be converted into an analog video input signal, which is then displayed on a display device 18.

In response to a code request signal from the video code buffer 10, the control circuit 6 supplies the data stored in the ring buffer 5 to the video code buffer 10. When the amount of data transferred from the video code buffer 10 to the inverse VLC circuit 11 is decreased, for example, as a result of continuous data processing of simple pictures which exhibit a small amount of data, the amount of data transferred from the ring buffer 5 to the video code buffer 10 is also decreased. Consequently, the amount of data stored in the ring buffer 5 may increase, and the write pointer WP may potentially pass the read pointer RP to cause overflow of the ring buffer 5.

To prevent such a problem, the control circuit 6 calculates the current amount of data stored in the ring buffer 5 based on the address positions of the write pointer WP and the read pointer RP. When the calculated data quantity exceeds a predetermined amount, a track jump decision circuit 7 determines that the ring buffer 5 may potentially overflow and sends a track jump command to the tracking servo circuit 8. In response to the track jump command, the tracking servo circuit 8 causes the pickup 2 to jump tracks depending on the storage capacity of the ring buffer 5 to prevent any overflow or underflow of the ring buffer 5. This advantageously allows continuous video reproduction with a uniform picture quality regardless of the complexity (or flatness) of the pictures recorded on the disk 1.

The data transfer rate from the ring buffer 5 to the video code buffer 10 is preset to be equal to or lower than the data transfer rate from the ECC circuit 33 to the ring buffer 5 to allow the video code buffer 10 to transmit to the ring buffer a code request for data transfer regardless of a track jump.

Figure 14B:
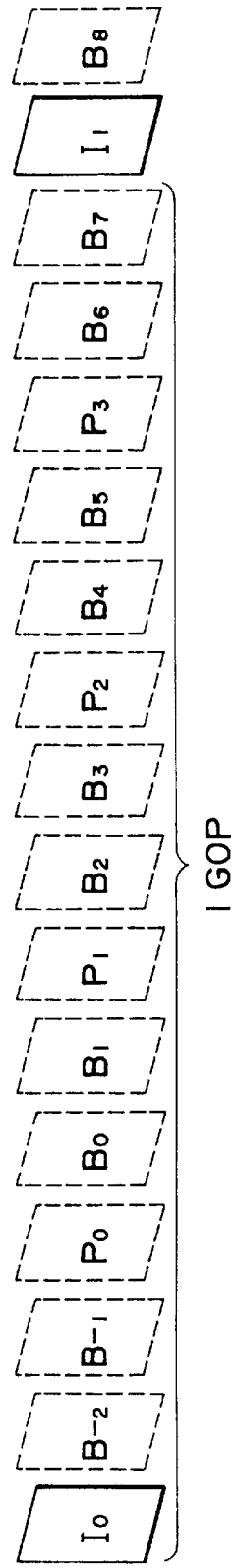
Figure 21:
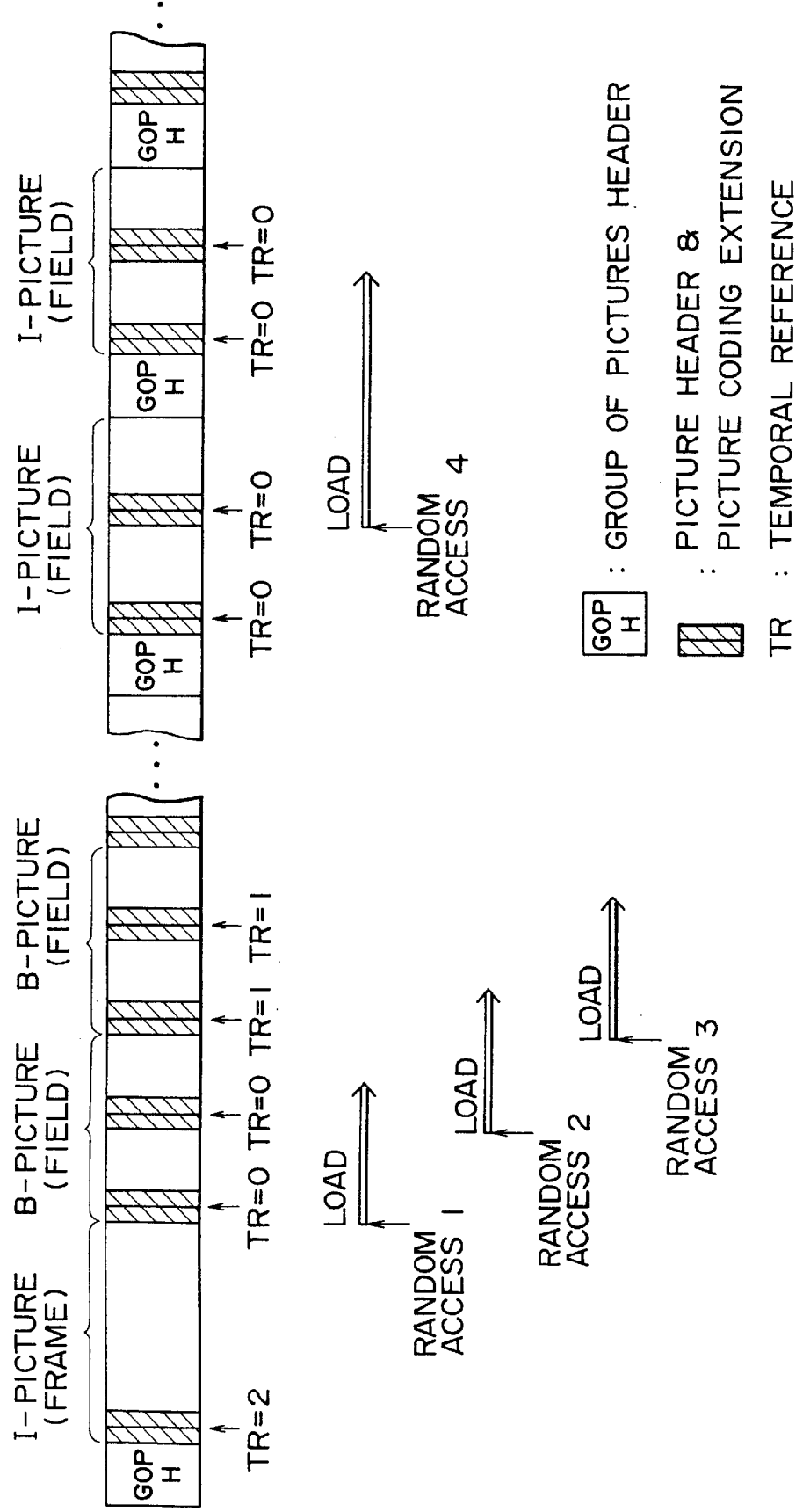
FIG. 21 is a diagram of a video stream showing how two video formats (field and frame) are differentiated.
Figure 22:
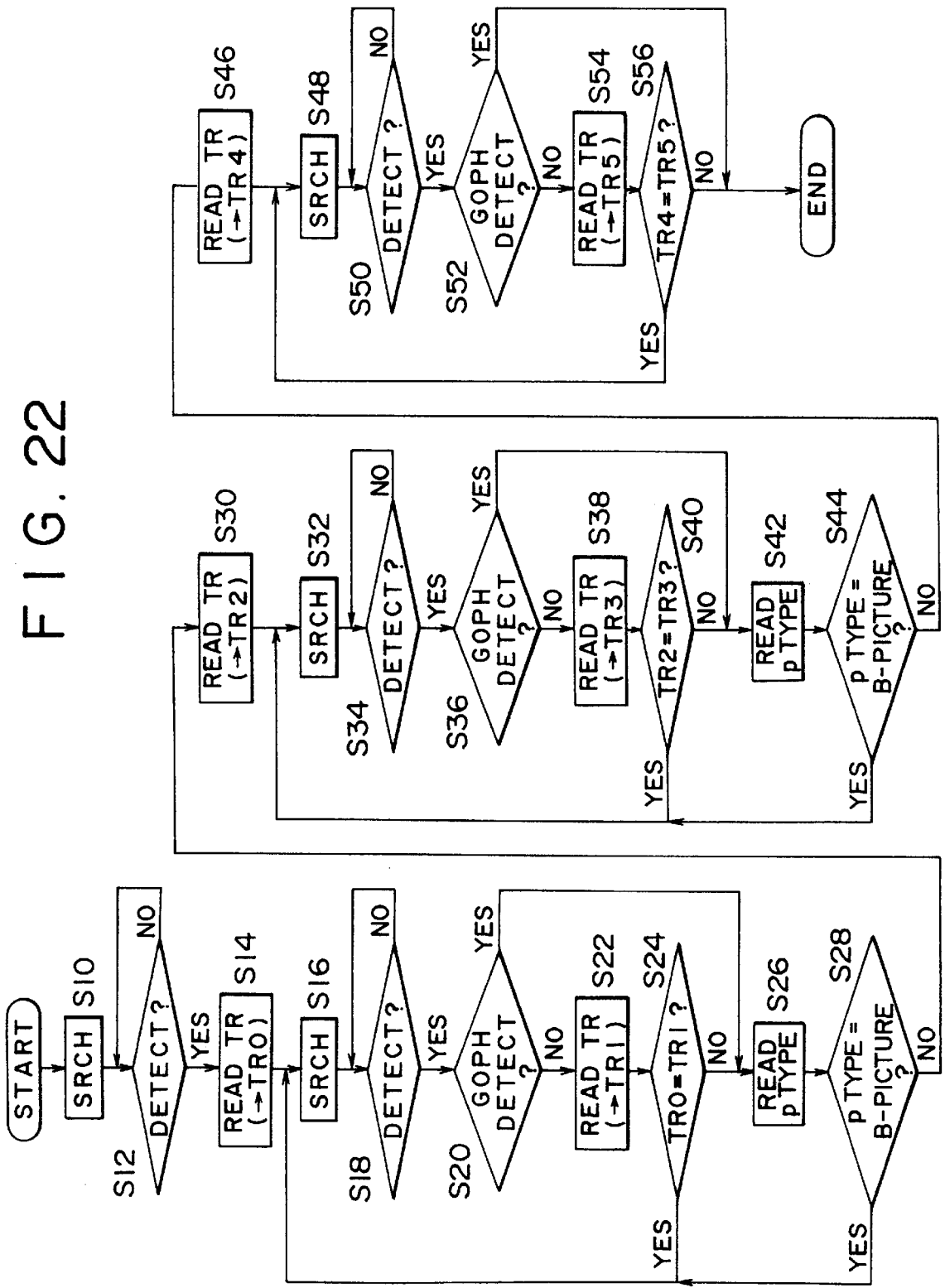
FIG. 22 is a flow chart of a routine executed in a stream detector to load three frames of the picture data (one I picture and two P pictures) where field and frame video formats are intermingled.

In a normal reproduction mode it is assumed, for example, that I, P and B picture data $I_0, B_{-2}, B_{-1} P_0, B_0, B_1, \ldots$ are recorded on the disk 1 in the order shown in FIG. 14B. In this example, one GOP is composed of fifteen frames of pictures including one frame of I-picture, four frames of P-pictures and ten frames of B-pictures. Normal reproduction of the pictures is performed by sequentially reading and decoding the coded data in the recording order shown in FIG. 14B and displaying the decoded data in the order shown in FIG. 14A.

More specifically, at the time of decoding the I-picture $I_0$, the decoded output obtained from the inverse DCT circuit 13 is supplied directly to the frame memory bank 16. However, at the time of decoding the B-picture $B_{-2}$, the previously decoded P-picture (not shown) and I-picture $I_0$, both of which are used as references for predictive-coding the B-picture $B_{-2}$ are supplied from the frame memory bank 16 to the motion compensator 15, and a motion predicted picture is generated in accordance with the motion vector information supplied from the inverse VLC circuit 11. The generated motion predicted picture then is supplied to the adder 14 which adds the motion predicted picture to the output of the inverse DCT circuit 13, whereby the B-picture $B_{-2}$ is decoded and stored in the frame memory bank 16.

The B-picture $B_{-1}$ is decoded in the same manner as the B-picture $B_{-2}$ and overwrites the B-picture $B_{-2}$ that is stored in one of frame memories 16a–16c of the frame memory bank. In decoding the P-picture $P_0$, the I-picture $I_0$ is supplied from the frame memory bank 16 to the motion compensator 15 along with the motion vector information supplied from the inverse VLC circuit. The motion compensator supplies a motion predicted picture to adder 14 which adds this motion predicted picture to the P-picture $P_0$ supplied from the inverse DCT circuit to thereby decode the P-picture $P_0$. The decoded P-picture $P_0$ thus decoded is written over the oldest data (which can be either the I-picture or the P-picture) stored in the frame memory bank 16.

Thus, the pictures are decoded sequentially as mentioned above, but are read out from the frame memory bank 16 in their original order and displayed on the display device 18 in the order shown in FIG. 14A.

In a fast reproduction mode, the data recorded on the disk 1 needs to be decoded and displayed in reverse order. For example, if a B-picture $B_{07}$ is decoded from the disk 1, on which video data is recorded in the order shown in FIGS. 9A and 9B (only video data are shown for simplicity), it is necessary to decode the P-pictures $P_{08}$ and $P_{05}$ prior to decoding the B-picture $B_{07}$ because these P-pictures need to be used as reference to decode the desired B-picture $B_{07}$. However, it is appreciated that the decoded P-picture $P_{05}$ is required for decoding the P-picture $P_{08}$ and the decoded I-picture $I_{02}$ is required for decoding the P-picture $P_{05}$. Consequently, decoding must start from the I-picture located at the beginning of the GOP. Upon termination of decoding one GOP, the operation needs to jump back to the preceding GOP to continue the decoding process.

However, if reverse reproduction is performed with such decoding technique, an excessive time delay will be introduced in displaying the pictures, thereby resulting in the display of unnatural pictures. The present invention resolves this problem by decoding only the I- and P-pictures as in the normal reproduction mode, but performs reverse reproduction using only the same three frame memories 16a, 16b, and 16c required for normal reproduction. Thus, the present invention advantageously decodes a total of three pictures, an I-picture appearing after an entry sector and two succeeding P-pictures, rather than decode an entire sequence of I- and P- pictures; thereby enabling fast reverse reproduction with minimal circuit complexity.

The present invention is capable of performing fast reverse reproduction by means of a PSM detector 40 of a simplified circuit configuration without using a stream detector which exhibits a complicated configuration as described hereinabove. Since the PSM detector 40 detects information representing the number of offset bytes given in ip__ipp__descriptor in a PSM, it is possible to write into ring buffer 5 only the requisite range of the data stream from an I-picture appearing immediately after an entry sector to the two succeeding P-pictures which appears after the I-picture.

The operation performed by the data decoding apparatus of FIGS. 8A and 8B in a fast reverse (FR) reproduction mode will be described with reference to FIGS. 9A to 9C.

FIGS. 9A and 9B show the order of video data recorded on the disk 1. The video data shown in these diagrams correspond to four GOPs, and in the FR reproduction mode, the control circuit 6 executes its control action in such a manner that the pickup 2 reads the video data from the disk 1 in the order indicated by arrows under the video data. More specifically, the pickup 2 successively reads the video data of I-picture $I_{32}$, B-picture $B_{30}$, B-picture $B_{31}$, P-picture $P_{35}$, B-picture $B_{33}$, B-picture $B_{34}$ and P-picture $P_{38}$ in this order, then jumps to an immediately preceding GOP, and reads the video data of I-picture $I_{22}$ to second P-picture $P_{28}$. Subsequently the pickup 2 jumps to another preceding GOP, and reads the video data of I-picture $I_{12}$ to second P-picture $P_{18}$. Next the pickup 2 jumps to a further preceding GOP, and then reads the video data of I-picture $I_{02}$ to second P-picture $P_{08}$. Thereafter, similarly to the above, the pickup 2 reads the video data of an I-picture positioned at the beginning of a next preceding GOP to the second P-picture positioned posterior to that I-picture.

Such reading operation is possible because the aforementioned entry point information is written in the entry sector formed at the top of each GOP and the PSM detector 40 detects the ip__ipp__descriptor in the entry sector and then supplies the detected ip__ipp__descriptor to the control circuit 6. Consequently, the control circuit 6 controls the pickup 2 to read, from the top (or beginning) of the entry sector, the data corresponding to the number of bytes represented by the information of bytes__to__second__P__pic given in the ip_ipp_descriptor, whereby the pickup 2 is enabled to read out the video data in the order indicated by the arrows in FIGS. 9A to 9C.

For accessing the top of the immediately preceding GOP, the distance (data length) information represented as an offset address in the PSD in the entry sector is used and signifies the distance to the preceding entry sector.

The read video data ranging from the I-picture positioned at the beginning of the GOP to the second P-picture positioned posterior to the I-picture are separated from the audio data and other data by the demultiplexer 32 and then are written into the video code buffer 10. The B-pictures are eliminated by utilizing the detection information obtained from the picture header detector 34, and by decoding only the I- and P-picture data which are written into the frame memory bank 16. The video data thus written are read out from the frame memory 16 in the reverse picture display order shown in FIG. 9C and displayed on the display device 18.

The data read/write timing for the frame memory bank 16 in the FR reproduction mode is described with reference to FIG. 10. Preferably, the frame memory bank 16 is provided with three frame memories 16a, 16b and 16c, as shown in FIG. 8. The writing of the decoded I-picture $I_{32}$ at the top of the beginning GOP (see FIG. 9B) in the frame memory 16a starts at time point t0, and terminates at time point t1 after a lapse of one frame. Subsequently the writing of the P-picture $P_{35}$, decoded with reference to the I-picture $I_{32}$, in the frame memory 16b starts at point t1, and terminates at time point t2 after a lapse of one frame.

Further the writing of the P-picture $P_{38}$, decoded with reference to the P-picture $P_{35}$ in the frame memory 16, starts at time point t2, and terminates at time point t3 after a lapse of one frame. The reading of the P-picture $P_{38}$ from the frame memory 16c may begin at an intermediate point between the two time points t2 and t3, provided one field of the P-picture $P_{38}$ has already been written in the frame memory 16c by this reading start time point. Hence, it is possible to simultaneously read from and write to the same frame memory by delaying the read timing from the write timing by one-field.

The reading of the P-picture $P_{38}$ from the frame memory 16c terminates at an intermediate point between the two time points t3 and t4, and the writing of the decoded I-picture $I_{22}$ of the preceding GOP in the frame memory 16c starts at time point t3. This writing terminates at time point t4 after a lapse of one frame.

Different picture data can be written in the frame memory 16c while simultaneously reading the previously written picture data therefrom as mentioned above because the write timing preferably has a one-field delay relative to the read timing.

Thereafter the picture data decoded as shown in FIGS. 9A to 9B are written in the frame memories 16a, 16b and 16c in the order of $I_{32}$, $P_{35}$, $P_{38}$, $I_{22}$, $P_{25}$, $P_{28}$, $I_{12}$, $P_{15}$, $P_{18}$, $I_{02}$, $P_{05}$ . . . and so forth. Meanwhile the picture data are read out from the frame memories 16a, 16b and 16c in the order from the oldest (largest) picture number toward the newer (smaller) picture number as $P_{38}$, $P_{35}$, $I_{32}$, $P_{28}$, $P_{25}$, $I_{22}$, $P_{18}$, $P_{15}$, $I_{12}$ . . . and so forth.

Consequently, fast reverse reproduction is carried out and the pictures are displayed in the order shown in FIG. 9C. For example, three pictures per GOP can be reversely reproduced when three frame memories are employed.

In the reverse reproduction mode, identifying numbers assigned to the pictures are detected, and the pictures are read out from the frame memory bank 16 in the order from the oldest to newest (largest to smallest) number. Temporal references (TR), which signify the numbers indicating the display order of the pictures, are reset at the respective tops of the GOPs, and the values of such temporal references are in a range of 0 to 1023.

Referring now to FIGS. 11A to 11C, an explanation is provided for fast forward (FF) reproduction performed in the data decoding apparatus of FIGS. 8A and 8B. FIGS. 11A and 11B show the video data of four GOPs in the order in which they are recorded on the disk 1, wherein arrows under the video data indicate the order of the video data to be read out in the FF reproduction mode.

In the FF reproduction mode, the PSM detector 40 detects an ip_ipp_descriptor in the entry sector written at the top of each GOP and supplies the detected ip_ipp_descriptor to the control circuit 6, as in the aforementioned FR reproduction mode. The control circuit 6 controls the pickup 2 to read out, from the top of the entry sector, the data corresponding to the number of bytes represented by the information of bytes_to_second_P_pic in the ip_ipp_descriptor, whereby the video data is read out in the order indicated by arrows in FIG. 11C.

The B-pictures, whose identities are present in the respective picture headers, are eliminated from the read video data so that only the I- and P-pictures are decoded. The decoded I- and P-pictures are read out from the frame memory bank 16 in the decoding order and are displayed on the display device 18 in the order of $I_{02}$ $P_{05}$ $P_{08}$ $I_{12}$ $P_{15}$ $P_{18}$ $I_{22}$ $P_{25}$ $P_{28}$ $I_{32}$ $P_{35}$ $P_{38}$, as shown in FIG. 11C.

Although, three frame memories preferably are incorporated in the frame memory bank 16, the number of frame memories is not limited to three, and any desired number may be chosen. Fast forward (FF) reproduction will be performed with I- and P-pictures equal in number to the frame memories.

FR reproduction performed with only two frame memories 16a and 16b in the frame memory bank 16 now will be described with reference to FIGS. 12A to 12C and FIG. 13.

FIGS. 12A and 12B show the order in which video data is recorded on the disk 1. The video data in FIGS. 12A and 12B correspond to four GOPs, and in the FR reproduction mode, the control circuit 6 controls the pickup 2 to read the video data from the disk 1 in the order indicated by arrows under the video data. More specifically, the pickup 2 successively reads the video data of I-picture $I_{32}$, B-picture $B_{30}$, B-picture $B_{31}$ and P-picture $P_{35}$ in this order, then jumps to an immediately preceding GOP, and reads the video data of I-picture $I_{22}$ to first P-picture $P_{25}$. Subsequently the pickup 2 jumps to another preceding GOP, and reads the video data of I-picture $I_{12}$ to first P-picture $P_{15}$. Next the pickup 2 jumps to a further preceding GOP, and then reads the video data of I-picture $I_{02}$ to first P-picture $P_{05}$. Thereafter, similarly to the above, the pickup 2 reads the video data of an I-picture positioned at the beginning of the next preceding GOP to the first P-picture positioned posterior to that I-picture.

Such operation is effected because the PSM detector 40 detects the information of bytes_to_first_P_pic in an ip_ipp_descriptor in the entry sector written at the top of each GOP and then supplies the detected information to the control circuit 6. More specifically, the control circuit 6 controls the pickup 2 to read, from the top of the entry sector, the data corresponding to the number of bytes represented by the information of bytes_to_first_P_pic given in the ip_ipp_descriptor, whereby the pickup 2 is enabled to read out the video data in the order indicated by arrows in FIGS. 9A to 9B.

The read video data ranging from the I-picture positioned at the beginning of the GOP to the first P-picture positioned posterior to that I-picture are separated from the audio and other data by the demultiplexer 32 and are written in the video code buffer 10. Subsequently the B-pictures, whose identities are present in the respective picture headers, are eliminated and only the I- and P-picture data are decoded and written into the frame memory bank 16. The video data thus written are read out from the frame memory 16 in the picture display order shown in FIG. 12C and are displayed on the display device 18.

Figure 13:
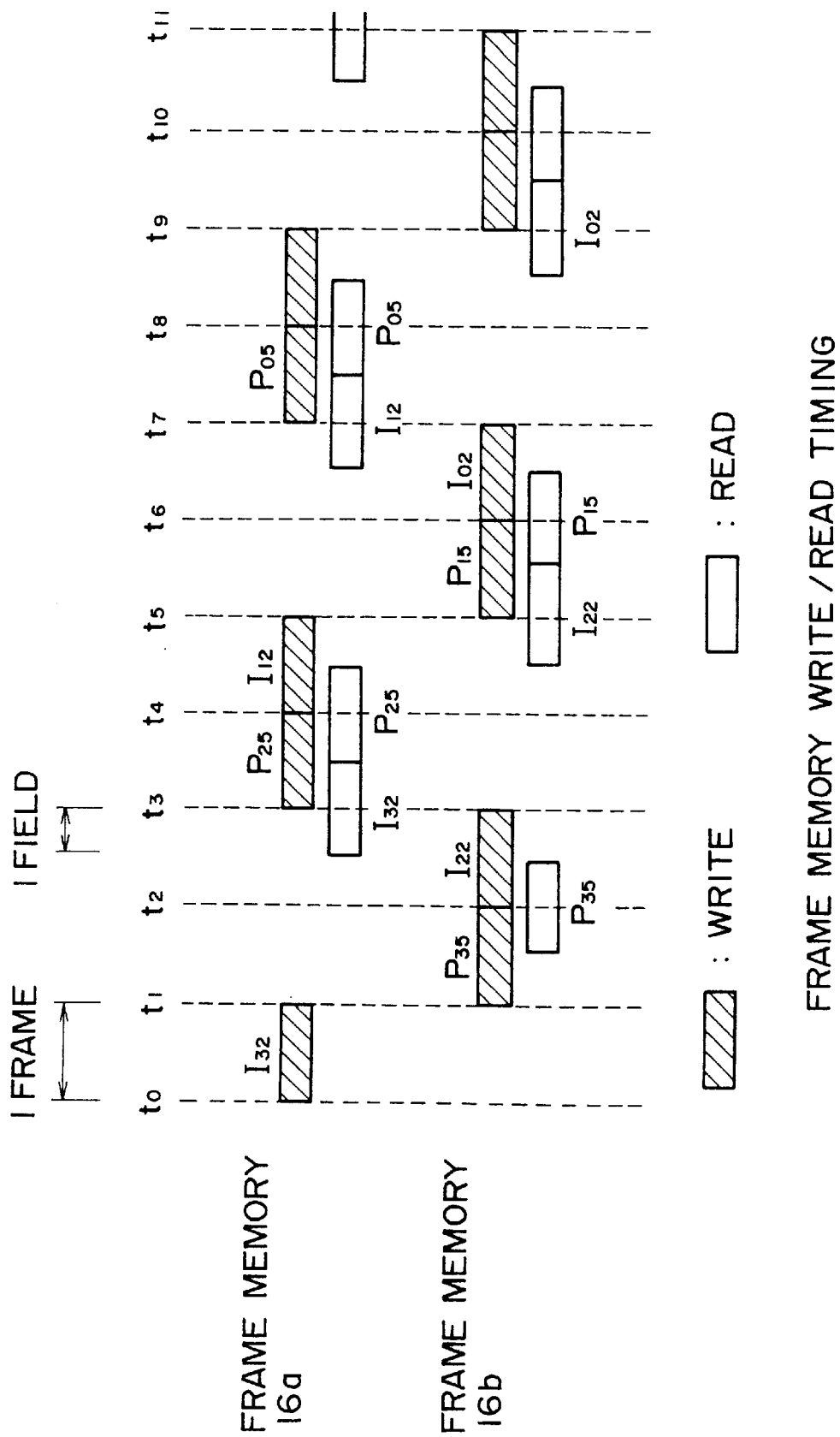
FIG. 13 is a read/write timing diagram to which reference will be made in describing how video data is read using two frame memories in the fast reverse reproduction mode of the data decoding apparatus of FIGS. 8A and 8B.

FIG. 13 is a data read/write timing diagram for the frame memory bank 16 of a two-frame capacity. The writing of the decoded I-picture $I_{32}$ at the beginning of the latest GOP in FIG. 12B into the frame memory 16a starts at time point t0, and terminates at time point t1 after a lapse of one frame. Subsequently the writing of the P-picture $P_{35}$, decoded with reference to the I-picture $I_{32}$, into the frame memory 16b starts at point t1, and terminates at time point t2 after a lapse of one frame.

The reading of the P-picture $P_{35}$ from the frame memory 16b starts at an intermediate point between the two time points t1 and t2, provided one field of the P-picture $P_{35}$ has already been written into the frame memory 16b at this reading start time point. Hence, it is possible to simultaneously read from and write to the same frame memory 16b by delaying the read timing relative to the write timing by one-field. Thus, different picture data can be written in the frame memory 16b while simultaneously reading a previously written picture data therefrom.

The reading of the P-picture $P_{35}$ from the frame memory 16b terminates at an intermediate point between the two time points t2 and t3, and the writing of decoded I-picture $I_{22}$ of the preceding GOP into the frame memory 16b starts at time point t2. This writing terminates at time point t3 after a lapse of one frame.

The I-picture $I_{32}$ is read out from the frame memory 16a at an intermediate point between the two time points t2 and t3, and after approximately a one-field delay from this reading start point, the writing of the decoded P-picture $P_{25}$ in the frame memory 16a starts. One frame of the I-picture $I_{32}$ is completely read out at an intermediate point between the time points t3 and t4, and subsequently one frame of the P-picture $P_{25}$ is completely read out from the frame memory 16a. Further, one frame of the I-picture $I_{12}$ in the preceding GOP is written into the frame memory 16a between time points t4 and t5.

The picture data decoded as shown in FIGS. 12A to 12B are written into the frame memories 16a and 16b in the order $I_{32}$, $P_{35}$, $I_{22}$, $P_{25}$, $I_{12}$, $P_{15}$, $I_{02}$, $P_{05}$ . . . ; and are read out in the order from the oldest (largest) picture number toward the newer (smaller) picture number as $P_{35}$, $I_{32}$, $P_{25}$, $I_{22}$, $P_{15}$, $I_{12}$, $P_{05}$, $I_{02}$ . . .

As described hereinabove, one I-picture and two or one P-picture per GOP are displayed in the special reproduction mode. It is appreciated that the present invention may be modified to decode and display only one I-picture per GOP and to eliminate both P-pictures and B-pictures. In such case, information for detecting the number of bytes up to the end of the I-picture is recorded in a PSD (Program Stream Directory). More specifically, in the program stream directory defined according to the MPEG system (ISO 13818-1), information relative to the I-picture immediately after the PSD is recorded as a reference access unit, and three values of PES_header_position_offset, reference_offset and bytes_to_read are added together to determine the data length (total number of bytes) from the first byte of the PSD to the end of the I-picture.

When the storage capacity of the frame memories exceeds three frames, more than three frames per GOP may be decoded and reproduced in the special reproduction mode. In such case, information representing the data length is written in the PSM so that three or more P-pictures appearing after the I-picture can be accessed.

Although the above examples show a jump to an adjacent GOP in the special reproduction mode, the jump may be executed to a distant GOP in performing special reproduction.

In the present invention where the pickup 2 jumps in the special reproduction mode, the video data in the video stream are at different rates since the compression degrees thereof are different depending on the picture types (I, P or B) or the attributes of those pictures (flat or complex). Consequently, the seek time is not fixed and there may arise some difficulties in performing equimultiple-speed FF/FR reproduction. To avoid such difficulties, the seek time or display interval is measured by the system controller, and the distance to the next seek is changed in accordance with the measured time, whereby speed control is achieved through feedback control. For example, if a longer time has been taken in any one seek, the pickup 2 jumps to a slightly distant position in a unit of GOP to thereby gain the necessary distance.

Although this invention has been described in conjunction with an optical recording medium, it is to be understood that the recording/reproducing method and apparatus of the invention can be used with other recording media or to transmit the compressed video data.

Since special reproduction such as reverse reproduction can be performed by the present invention with circuit of less expense and complexity, some components of the apparatus, including substrates and special circuits, can be dimensionally reduced to consequently decrease power consumption, hence minimizing the generation of heat and minimizing the structure needed for heat radiation.

In the special reproduction mode, an I-picture alone may be recovered, an I-picture and one P-picture may be recovered, or an I-picture and two P-pictures may be recovered. These configurations may be selectively switched so that the special reproduction speed may be controlled by changing the number of pictures to be loaded into the frame memory and displayed. By using one or two P-pictures in addition to an I-picture, so that scenes can be smoothly displayed to provide a satisfactory visual presentation.

While the present invention has been particularly shown and described with reference to preferred embodiments, it will be readily appreciated that various changes may be made without departing from the spirit and scope of the invention. It is intended that the appended claim be interpreted to include the embodiments discussed above, those various alternatives which have been described and all equivalents thereto.

What is claimed is:

1. A method for recording picture data on a recording medium for special reproduction, comprising the steps of:
    receiving said picture data;
    coding said picture data using intra-picture coding and predictive coding to provide a data stream containing at least one intra-picture coded picture data (I-picture), at least one bi-directional predictive coded picture (B-picture) and at least one predictive coded picture data (P-picture) in a predetermined order, wherein said at least one I-picture precedes said at least one P-picture;

generating positional information representing a data location with respect to said at least one I-picture and said at least one P-picture;

recording on said recording medium for special reproduction said at least one I-picture, said at least one B-picture and said at least one P-picture in an order in which the picture data is to be decoded during normal reproduction and said positional information; and wherein said step of generating generates said positional information such that said at least one P-picture is detectable upon special reproduction on the basis of said positional information without a stream detector.

2. The method of claim 1, wherein the step of generating positional information includes generating positional information representing data length from said at least one I-picture to the end of said at least one P-picture.

3. The method of claim 1, wherein the step of recording records said at least one I-picture and said at least one P-picture in a sector; and wherein the step of generating positional information further includes generating positional information representing a data length to the end of said at least one P-picture.

4. The method of claim 3, wherein the step of recording includes recording said positional information in said sector.

5. The method of claim 4, wherein the step of coding includes bidirectionally predictive coding the picture data to provide a plurality of bidirectionally predictive coded pictures (B-picture) in said data stream.

6. The method of claim 4, wherein each of said at least one I-picture and said at least one P-picture constitutes a frame.

7. The method of claim 1, wherein the data stream contains two P-pictures; and wherein the step of generating positional information further includes generating positional information representing the data length from said at least one I-picture to the end of a second of said two P-pictures.

8. The method of recording according to claim 1, wherein said step of coding codes said picture data in accordance with the MPEG standard.

9. The method of recording according to claim 8, wherein said step of recording records said picture data in an order of a group of pictures as prescribed by the MPEG standard.

10. The method according to claim 1, wherein said step of recording positional information represents the data location from the beginning of a sector that includes said positional information to a last byte of said at least one P-picture.

11. The method according to claim 1, wherein said step of recording follows a DVD standard.

12. An apparatus for recording picture data on a record medium, comprising:

means for receiving said picture data;

means for coding said picture data using intra-picture coding and predictive coding to provide a data stream containing at least one intra-picture coded picture data (I-picture), at least one bi-directional predictive coded picture (B-picture) and at least one predictive coded picture data (P-picture) in a predetermined order, wherein said at least one I-picture precedes said at least one P-picture;

means for generating positional information representing a data location with respect to the data between said at least one I-picture and said at least one P-picture;

means for recording said at least one I-picture, said at least one P-picture in an order in which the picture data is to be decoded and said positional information on said record medium; and wherein said means for generating generates said positional information such that said at least one P-picture is detectable upon special reproduction on the basis of said positional information without a stream detector.

13. The apparatus of claim 12, wherein said means for generating is operable to generate positional information representing data length from said at least one I-picture to the end of said at least one P-picture.

14. The apparatus of claim 12, wherein said means for recording is operable to record said at least one I-picture and said at least one P-picture in a sector; and wherein said means for generating is operable to generate positional information further representing a data length to the end of said at least one P-picture.

15. The apparatus of claim 14, wherein said means for recording is operable to record said positional information in said sector.

16. The apparatus of claim 15, wherein said means for coding is operable to code the picture data using bidirectionally predictive coding the picture data to provide a plurality of bidirectionally predictive coded pictures (B-picture) in said data stream.

17. The apparatus of claim 15, wherein each of said at least one I-picture and said at least one P-picture constitutes a frame.

18. The apparatus of claim 12, wherein the data stream contains two P-pictures; and wherein said means for generating is further operable to generate positional information representing the data length from said at least one I-picture to the end of a second of said two P-pictures.

19. The apparatus for recording according to claim 12, wherein said means for coding codes said picture data in accordance with the MPEG standard.

20. The apparatus for recording according to claim 19, wherein said means for recording records said picture data in an order of a group of pictures as prescribed by the MPEG standard.

21. A method of reproducing picture data from a recording medium, said picture data being recorded in an order in which the picture data is to be decoded during normal reproduction as a data stream representing groups of pictures (GOPs) with each GOP being composed of at least one intra-picture coded picture data (I-picture), at least one bi-directional predictive coded picture (B-picture) and at least one predictive coded picture data (P-picture), wherein said at least one I-picture precedes said at least one P-picture, said method comprising the steps of:

reproducing said data stream;

detecting positional information included in said data stream and representing a data location with respect to the data between said at least one I-picture and said at least one P-picture;

detecting from said data stream said at least one I-picture and said at least one P-picture in response to said positional information and deriving coded picture data therefrom;

decoding said coded picture data to provide decoded picture data; and wherein said step of detecting detects said P-picture during special reproduction on the basis of said positional information without a stream detector.

22. The method of claim 21, wherein the step of detecting positional information includes detecting positional information representing data length from said at least one I-picture to the end said at least one P-picture.

23. Tho method of claim 21, wherein the step of reproducing reproduces said data stream from a sector; and wherein the step of detecting further includes detecting positional information representing a data length to the end of said at least one P-picture.

24. The method of claim 23, wherein said positional information is recorded in said sector.

25. The method of claim 21, wherein the data stream contain two P-pictures; and wherein the step of detecting positional information further includes detecting positional information representing the data length from said at least one I-picture to the end of a second of said two P-pictures.

26. The method of reproducing picture data from a recording medium in accordance with claim 21, wherein in a special reproduction mode, said step of reproducing reproduces pictures, out of a group of pictures recorded in accordance with the MPEG standard, starting from said at least one I-picture in the group of pictures and ending with a second P-picture in the group of pictures.

27. The method of reproducing picture data from a recording medium in accordance with claim 26, further comprising the step of jumping to a next group of pictures to be reproduced in said special reproduction mode immediately upon completion of reproducing said second P-picture.

28. The method of reproducing picture data from a recording medium in accordance with claim 26, wherein during said special reproduction mode, said step of decoding decodes the reproduced I and P pictures such that said step of displaying displays decoded I and P pictures of the group of pictures.

29. Apparatus for reproducing picture data from a recording medium, said picture data being recorded in an order in which the picture data is to be decoded during normal reproduction as a data stream representing groups of pictures (GOPs) with each GOP being composed of at least one intra-picture coded picture data (I-picture), at least one bi-directional predictive coded picture (B-picture) and at least one predictive coded picture data (P-picture), wherein said at least one I-picture precedes said at least one P-picture, said apparatus comprising:

means for reproducing said data stream recorded in said order;

means for detecting positional information included in said data stream and representing a data location with respect to the data between said at least one P-picture and said at least one I-picture;

means for detecting from said data stream said at least one I-picture and said at least P-picture in response to said positional information and deriving coded picture data therefrom;

means for decoding said coded picture data to provide decoded picture data; and means for displaying said decoded picture data; and wherein said means for detecting detects said P-picture during special reproduction on the basis of said positional information without a stream detector.

30. The apparatus of claim 29, wherein said means for detecting is operable to detect positional information representing data length from said at least one I-picture to the end of said at least one P-picture.

31. The apparatus of claim 29, wherein said means for reproducing is operable to reproduce said data stream from a sector; and wherein said means for detecting said positional information is further operable to detect positional information representing a data length to the end of said at least one P-picture.

32. The apparatus of claim 31, wherein said positional information is recorded in said sector.

33. The apparatus of claim 32, wherein said coded picture data in the reproduced data stream includes a plurality of bidirectionally predictive coded picture data (B-pictures).

34. The apparatus of claim 32, wherein each of said at least one I-picture and said at least one P-picture constitutes a frame.

35. The apparatus of claim 29, wherein the data stream contains two P-pictures; and wherein said means for detecting is further operable to detect positional information representing the data length from said at least one I-picture to the end of a second of said two P-pictures.

36. The apparatus for reproducing picture data from a recording medium in accordance with claim 29, wherein in a special reproduction mode, said means for reproducing reproduces pictures, out of a group of pictures recorded in accordance with the MPEG standard, starting from said at least one I-picture in the group of pictures and ending with a second P-picture in the group of pictures.

37. The apparatus for reproducing picture data from a recording medium in accordance with claim 36, further comprising means for jumping to a next group of pictures to be reproduced in said special reproduction mode immediately upon completion of reproducing said second P-picture.

38. The apparatus for reproducing picture data from a recording medium in accordance with claim 36, wherein during said special reproduction mode, said means for decoding decodes the reproduced I and P pictures such that said means for displaying displays decoded I and P pictures of the group of pictures.

39. A recording medium for use in conjunction with processor-controlled apparatus and having a coded picture data recorded thereon in an order in which the picture data is to be decoded during normal reproduction, said coded picture data comprising at least one intra-picture coded picture (I-picture), at least one bi-directional predictive coded picture (B-picture) and at least one predictive coded picture (P-picture), and positional information representing a data location with respect to the data between said at least one I-picture and said at least one P-picture, thereby enabling the processor-controlled apparatus to reproduce from the recording medium the coded picture data in a special reproduction mode by using the positional information to select the P-picture coded picture data; wherein said P-picture is detectable during special reproduction on the basis of said positional information without a stream detector.

40. The recording medium of claim 39, wherein said positional information represents data length from said at least one I-picture to the end of said at least one P-picture.

41. The recording medium of claim 39, wherein said coded picture data is recorded in a sector; and wherein said positional information further represent a data length to the end of said at least one P-picture.

42. The recording medium of claim 41, wherein said positional information is recorded in said sector.

43. The recording medium of claim 42, wherein said coded picture data includes a plurality of bidirectionally predictive coded pictures (B-pictures).

44. The recording medium of claim 42, wherein each of said at least one I-picture and said at least one P-picture constitutes a frame.

45. The recording medium of claim 39, wherein the coded picture data comprises two P-pictures; and wherein said positional information further represents the data length from said at least one I-picture to the end of a second of said two P-pictures.

46. The recording medium according to claim 39, wherein said coded picture data recorded thereon is recorded in an order of a group of pictures as prescribed by the MPEG standard.

47. The recording medium of claim 39, wherein in a special reproduction mode, said step of reproducing reproduces said pictures, out of a group of pictures recorded in accordance with the MPEG standard, starting from said at least one I-picture in the group of pictures and ending with a second P-picture in the group of pictures.

48. Apparatus for recording and reproducing picture data on a recording medium, comprising:

means for receiving said picture data;

means for coding said picture data using intra-picture coding and/or predictive coding to provide a data stream containing at least one intra-picture coded picture data (I-picture), at least one bi-directional predictive coded picture (B-picture) and at least one predictive coded picture data (P-picture) in a predetermined order, wherein said at least one I-picture precedes said at least one P-picture;

means for generating positional information representing a data location with respect to the data between said at least one I-picture and said at least one P-picture;

means for recording said at least one I-picture, said at least one P-picture and the positional information on said recording medium in an order in which the picture data is to be decoded during normal reproduction;

means for reproducing said data stream from said recording medium recorded in said order;

means for detecting said positional information from said reproduced data stream;

means for detecting from said data stream said at least one I-picture and said at least one P-picture in response to said detected positional information and deriving coded picture data therefrom;

means for decoding said coded picture data to provide decoded picture data; and means for displaying said decoded picture data; and wherein said means for detecting detects said P-picture during special reproduction on the basis of said positional information without a stream detector.

49. The apparatus of claim 48, wherein said means for generating positional information is operable to generate positional information representing data length from said at least one I-picture to the end of said at least one P-picture.

50. The apparatus of claim 48, wherein said means for recording is operable to record said at least one I-picture and said at least one P-picture in a sector; and wherein said means for generating is operable to generate positional information further representing a data length to the end of said at least one P-picture.

51. The apparatus of claim 50, wherein said means for recording is operable to record said positional information in said sector.

52. The apparatus of claim 51, wherein said means for coding is operable to code the picture data using bidirectionally predictive coding the picture data to provide a plurality of bidirectionally predictive coded (B-pictures) in said data stream.

53. The apparatus of claim 51, wherein each of said at least one I-picture and said at least one P-picture constitutes a frame.

54. The apparatus of claim 48, wherein said means for detecting is operable to detect positional information representing data length from said at least one I-picture to the end of a first of said at least one P-picture.

55. The apparatus of claim 54, wherein said means for reproducing is operable to reproduce said data stream from a sector; and wherein said means for detecting said positional information is further operable to detect positional information representing data length from beginning of said sector including said at least one I-picture to the end of said at least one P-picture.

56. The apparatus of claim 55, wherein said positional information is recorded in said sector.

57. The apparatus of claim 48, wherein the data stream contains two P-pictures; and wherein said means for generating positional information is further operable to generate positional information representing the data length from said at least one I-picture to the end of a second of said two P-pictures.

58. The apparatus for recording and reproducing picture data according to claim 48, wherein said means for coding codes said picture data in accordance with the MPEG standard.

59. The apparatus for recording and reproducing picture data according to claim 58, wherein said means for recording records said picture data in an order of a group of pictures as prescribed by the MPEG standard.

60. The apparatus for recording and reproducing picture data from a recording medium in accordance with claim 48, wherein in a special reproduction mode, said means for reproducing reproduces pictures, out of a group of pictures recorded in accordance with the MPEG standard, starting from said at least one I-picture in the group of pictures and ending with a second P-picture in the group of pictures.

61. The apparatus for recording and reproducing picture data from a recording medium in accordance with claim 60, further comprising means for jumping to a next group of pictures to be reproduced in said special reproduction mode immediately upon completion of reproducing said second P-picture.

62. The apparatus for recording and reproducing picture data from a recording medium in accordance with claim 60, wherein during said special reproduction mode, said means for decoding decodes the reproduced I and P pictures such that said means for displaying displays decoded I and P pictures of the group of pictures.

* * * * *